United States Patent
Yoo et al.

(10) Patent No.: US 10,001,810 B2
(45) Date of Patent: Jun. 19, 2018

(54) FOLDABLE ELECTRONIC DEVICE INCLUDING FLEXIBLE DISPLAY

(71) Applicant: Samsung Electronics Co., Ltd., Gyeonggi-do (KR)

(72) Inventors: Chungkeun Yoo, Gyeonggi-do (KR); Youngsun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/605,538

(22) Filed: May 25, 2017

(65) Prior Publication Data

US 2018/0011515 A1    Jan. 11, 2018

(30) Foreign Application Priority Data

Jul. 6, 2016    (KR) .................. 10-2016-0085620

(51) Int. Cl.
  *G06F 1/16*    (2006.01)

(52) U.S. Cl.
  CPC .......... *G06F 1/1652* (2013.01); *G06F 1/1626* (2013.01); *G06F 1/1656* (2013.01); *G06F 1/1681* (2013.01); *G06F 1/163* (2013.01)

(58) Field of Classification Search
  CPC combination set(s) only.
  See application file for complete search history.

(56) References Cited

U.S. PATENT DOCUMENTS

| | | | |
|---|---|---|---|
| 9,348,362 B2 * | 5/2016 | Ko | G06F 1/1626 |
| 9,348,450 B1 * | 5/2016 | Kim | G06F 1/1681 |
| 9,354,476 B2 * | 5/2016 | Han | G02F 1/13452 |
| 9,600,035 B2 * | 3/2017 | Park | G06F 1/1681 |
| 9,606,583 B2 * | 3/2017 | Ahn | G06F 1/1681 |
| 9,615,473 B2 * | 4/2017 | Kim | G06F 1/1652 |
| 9,811,119 B2 * | 11/2017 | Seo | G06F 1/1652 |
| 2014/0320396 A1 | 10/2014 | Modarres et al. | |
| 2015/0241925 A1 | 8/2015 | Seo et al. | |

(Continued)

FOREIGN PATENT DOCUMENTS

| KR | 1020110100936 | 9/2011 |
|---|---|---|
| KR | 1020130073331 | 7/2013 |

OTHER PUBLICATIONS

International Search Report dated Sep. 20, 2017 issued in counterpart application No. PCT/KR2017/006190, 7 pages.

*Primary Examiner* — Lisa Lea Edmonds
(74) *Attorney, Agent, or Firm* — The Farrell Law Firm, P.C.

(57) ABSTRACT

An electronic device is provided which includes a first housing including a first face facing in a first direction, a second housing comprising a second face facing in the first direction, a hinge assembly for coupling the first housing to the second housing such that the first housing and the second housing are folded toward each other, and for allowing the first face and the second face to face each other when the first housing and the second housing are completely folded, a flexible display disposed in at least one area of the first face and at least one area of the second face, and across the hinge assembly, a guide member disposed in the hinge assembly which moves based on a folding motion and unfolding motion of the hinge assembly, and a drive assembly for moving the flexible display in a sliding manner in a direction opposite to a direction of the guide member on the second face.

20 Claims, 31 Drawing Sheets

(56) References Cited

U.S. PATENT DOCUMENTS

2015/0366089 A1\* 12/2015 Park ..................... G06F 1/1641
　　　　　　　　　　　　　　　　　　　　361/679.01
2016/0062412 A1　　3/2016 Park et al.
2017/0364123 A1\* 12/2017 Seo ...................... G06F 1/1652

\* cited by examiner

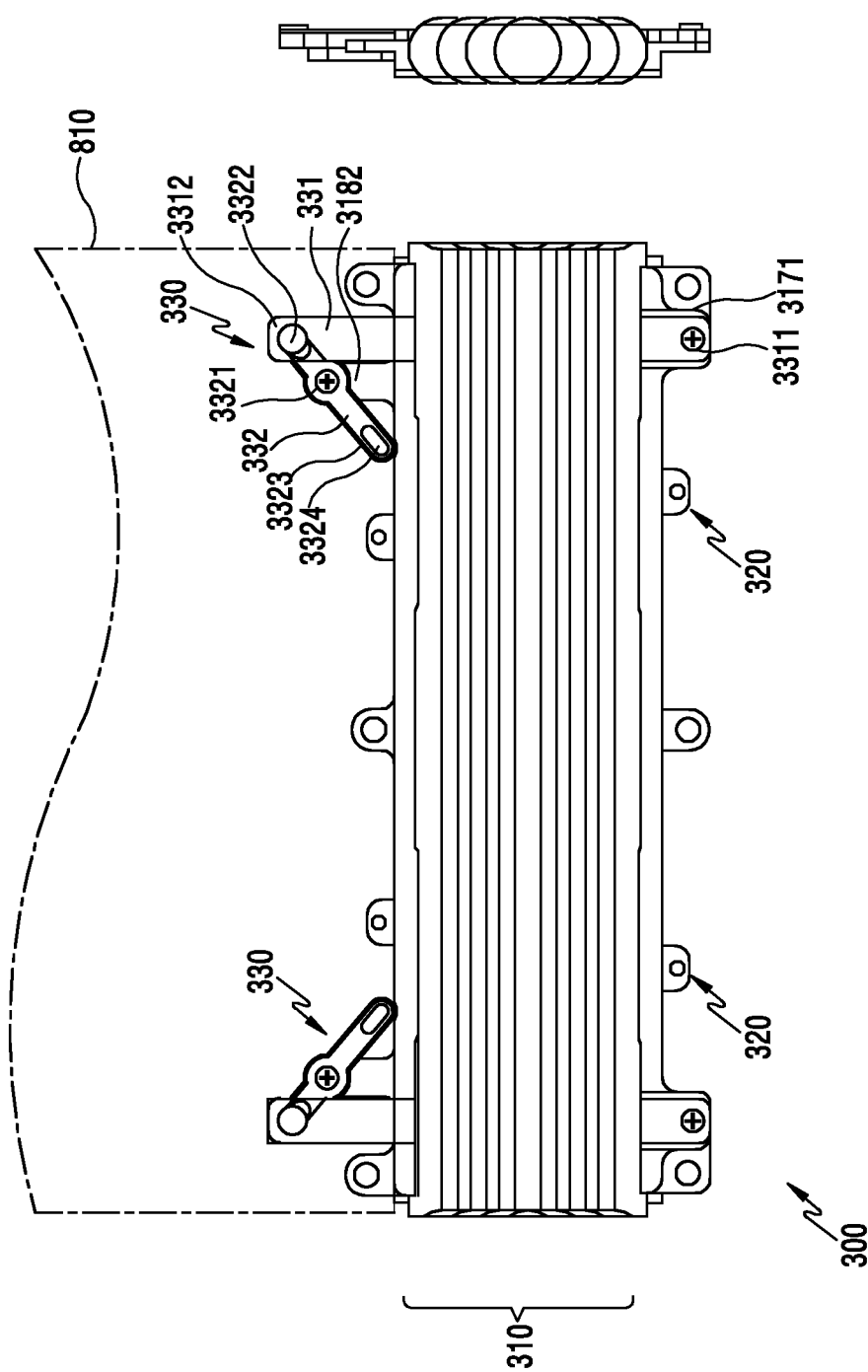

FOLDABLE ELECTRONIC DEVICE INCLUDING FLEXIBLE DISPLAY

PRIORITY

This application claims priority under 35 U.S.C. § 119(a) to Korean Patent Application Serial No. 10-2016-0085620, which was filed in the Korean Intellectual Property Office on Jul. 6, 2016, the entire content of which is incorporated herein by reference.

BACKGROUND

1. Field of the Disclosure

The present disclosure generally relates to an electronic device, and more particularly, to a foldable type electronic device including a flexible display.

2. Description of the Related Art

Portable electronic devices have become slimmer to satisfy the preferences of consumers and have been developed to improve user convenience. In particular, when a foldable type electronic device is used, the electronic device has a display area greater than or equal to that of a bar type electronic device, but its size may decrease by half by folding it when carried, thereby improving portability.

Recently, an effort has been made to apply a foldable display to the foldable type electronic device, and there is research being conducted to prevent a malfunction or breakage of the flexible display caused by a folding motion.

SUMMARY

According to an aspect of the present disclosure, an electronic device is provided which includes a first housing including a first face facing in a first direction, a second housing including a second face facing in the first direction, a hinge assembly for coupling the first housing to the second housing such that the first housing and the second housing can be folded toward each other, and for allowing the first face and the second face to face each other when the first housing and the second housing are completely folded, a flexible display disposed in at least one area of the first face and at least one area of the second face, and across the hinge assembly, a guide member disposed in the hinge assembly which moves based on a folding motion and unfolding motion of the hinge assembly, and a drive assembly for moving the flexible display in a sliding manner in a direction opposite to a direction of the guide member on the second face.

According to another aspect of the present disclosure, an electronic device is provided which includes a first housing including a first face facing in a first direction, a second housing including a second face facing in the first direction, a hinge assembly for coupling the first housing to the second housing such that the first housing and the second housing can be folded toward each other, and for allowing the first face and the second face to face each other when the first housing and the second housing are completely folded, a flexible display disposed in at least one area of the first face and at least one area of the second face, and across the hinge assembly, a guide member disposed in the hinge assembly which moves in a second direction perpendicular to the first direction based on a folding motion of the hinge assembly, and moves in a third direction facing the second direction based on an unfolding motion of the hinge assembly, a lever disposed to one end of the hinge assembly in a rotatable manner, and installed such that one end with respect to a rotation axis interlocks with the guide member, and a slide plate installed on the second face in a sliding manner by being connected to the other end of the lever to accommodate the flexible display. The lever may move the slide plate in a direction opposite to a movement direction of the guide member.

BRIEF DESCRIPTION OF THE DRAWINGS

The above and other aspects, features, and advantages of the present disclosure will be more apparent from the following description taken in conjunction with the accompanying drawings, in which:

FIG. 8A and FIG. 8B illustrate an operational relationship of a flexible display interlocking with a lever assembly based on a folded state of a hinge assembly according to an embodiment of the present disclosure;

DETAILED DESCRIPTION

Figure 1A:
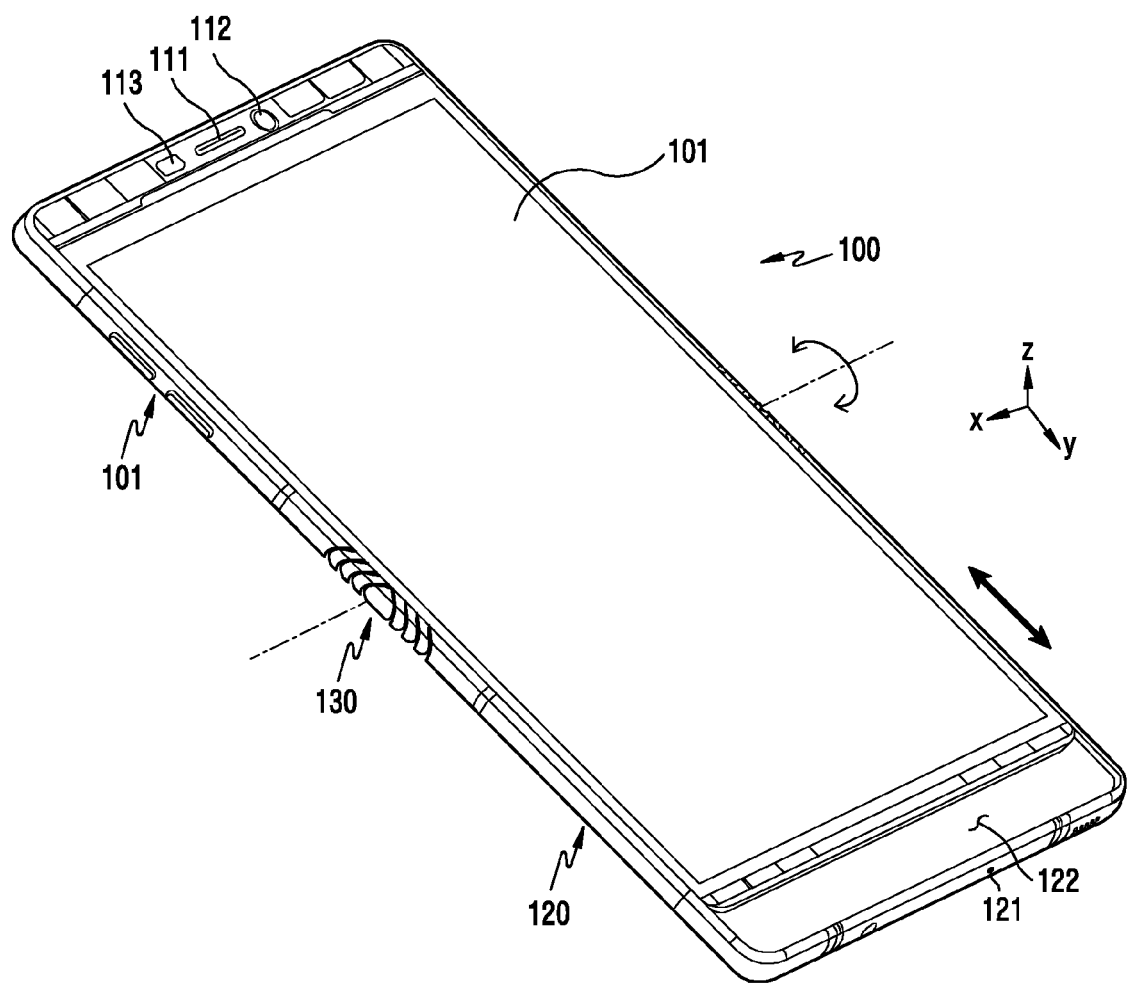
FIG. 1A is a perspective view illustrating a state in which a foldable type electronic device is fully open according to an embodiment of the present disclosure.

Hereinafter, certain embodiments of the present disclosure are described with reference to the accompanying drawings. It should be understood, however, that there is no limiting the embodiments of the present disclosure to the particular form disclosed, but, on the contrary, it is intended to cover all modifications, equivalents, and alternatives falling within the spirit and scope of the embodiments of the present disclosure. Like reference numerals denote like components throughout the drawings. A singular expression includes a plural concept unless there is a contextually distinctive difference therebetween. In the present disclosure, the expressions "A or B", "A and/or B", and the like may include all possible combinations of items enumerated together. Although expressions such as "$1^{st}$", "$2^{nd}$", "first", and "second" may be used to express corresponding elements, it is not intended to limit the corresponding elements. When a certain (e.g., $1^{st}$) element is mentioned as being "operatively or communicatively coupled with/to" or "connected to" a different (e.g., $2^{nd}$) element, the certain element is directly coupled with/to another element or may be coupled with/to the different element via another (e.g., 3rd) element.

The expression "configured to" as used in the present disclosure may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a general-purpose processor (e.g., central processing unit (CPU) or an application processor) capable of performing corresponding operations by executing one or more software programs stored in a memory device.

An electronic device according to an embodiment of the present disclosure may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 audio layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a head-mounted device (HMD)), a fabric or clothes-integrated device (e.g., electronic clothes), a body attaching-type device (e.g., a skin pad or tattoo), or a body implantable device (e.g., an implantable circuit). The electronic device may include, for example, at least one of a television (TV), a digital video disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to an embodiment of the present disclosure, the electronic device may include at least one of various medical devices (e.g., various portable medical measuring devices (e.g., a blood sugar measuring device, a heart rate measuring device, a blood pressure measuring device, a body temperature measuring device, etc.), magnetic resonance angiography (MRA), magnetic resonance imaging (MRI), computed tomography (CT), imaging equipment, ultrasonic instrument, etc.)), a navigation device, a global positioning system (GPS) receiver, an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller machine (ATM), a point of sales (POS) terminal, and an Internet of things (IoT) device (e.g., a light bulb, various sensors, an electric or gas meter, a sprinkler device, a fire alarm, a thermostat, a streetlamp, a toaster, fitness equipment, a hot water tank, a heater, a boiler, etc.).

The electronic device may include at least one of one part of furniture, buildings/constructions or cars, an electronic board, an electronic signature receiving device, a projector, and various measurement machines (e.g., water supply, electricity, gas, propagation measurement machine, etc.). The electronic device may be a combination of two or more of the aforementioned various devices. The electronic device is not limited to the aforementioned devices. The term 'user' as used in the present disclosure may refer to a person who uses the electronic device or a device (e.g., an artificial intelligence (AI) electronic device) which uses the electronic device.

According to an embodiment of the present disclosure, although a foldable type portable electronic device is illustrated and described herein, the present disclosure is not limited thereto. For example, the present disclosure may be applied to various foldable type electronic devices such as a foldable type notebook PC, a foldable tablet PC, and the like.

FIG. 1A is a perspective view illustrating a state in which a foldable type electronic device is fully open according to an embodiment of the present disclosure.

Figure 1B:
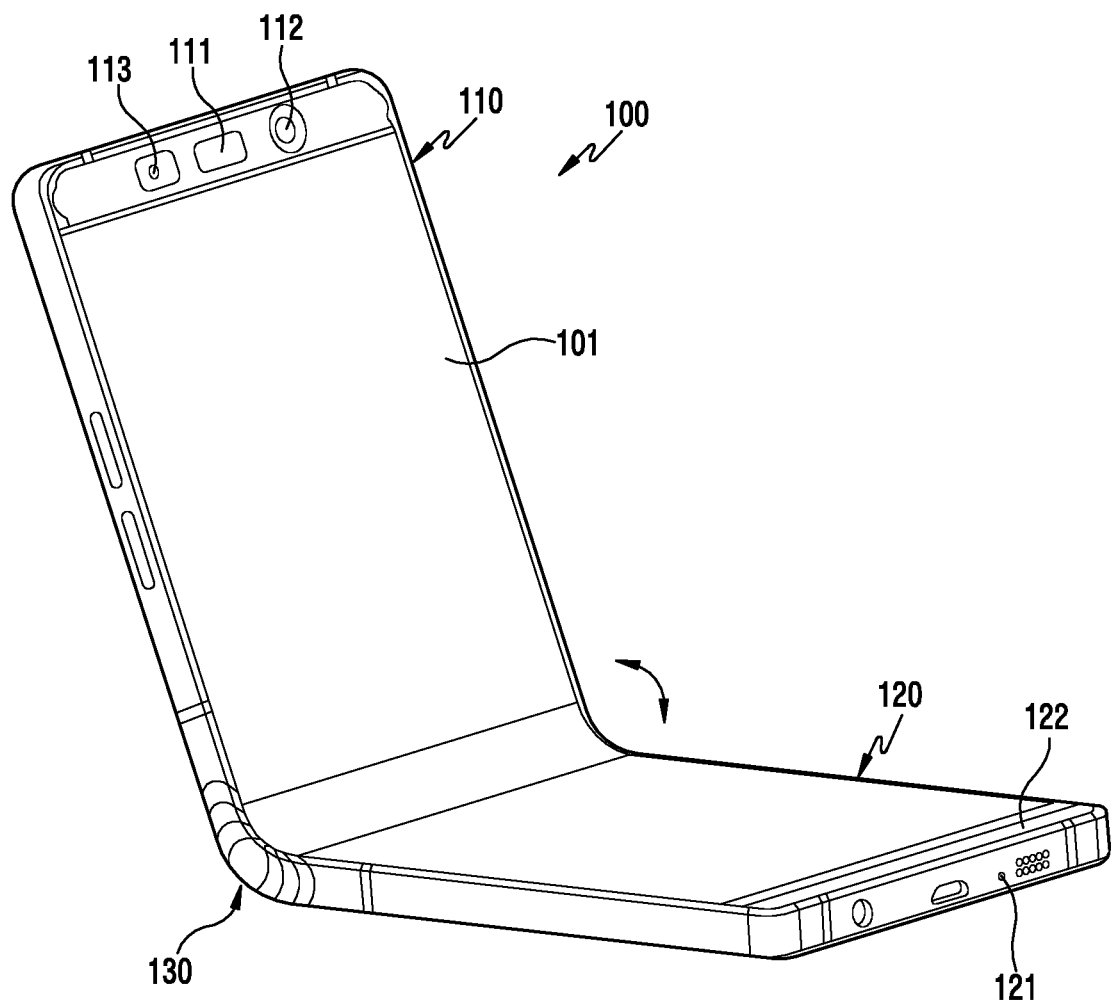
FIG. 1B is a perspective view illustrating a state in which the electronic device of FIG. 1A is open by a specific angle according to an embodiment of the present disclosure.

FIG. 1B is a perspective view illustrating a state in which the electronic device of FIG. 1A is open by a specific angle according to an embodiment of the present disclosure.

Figure 1C:
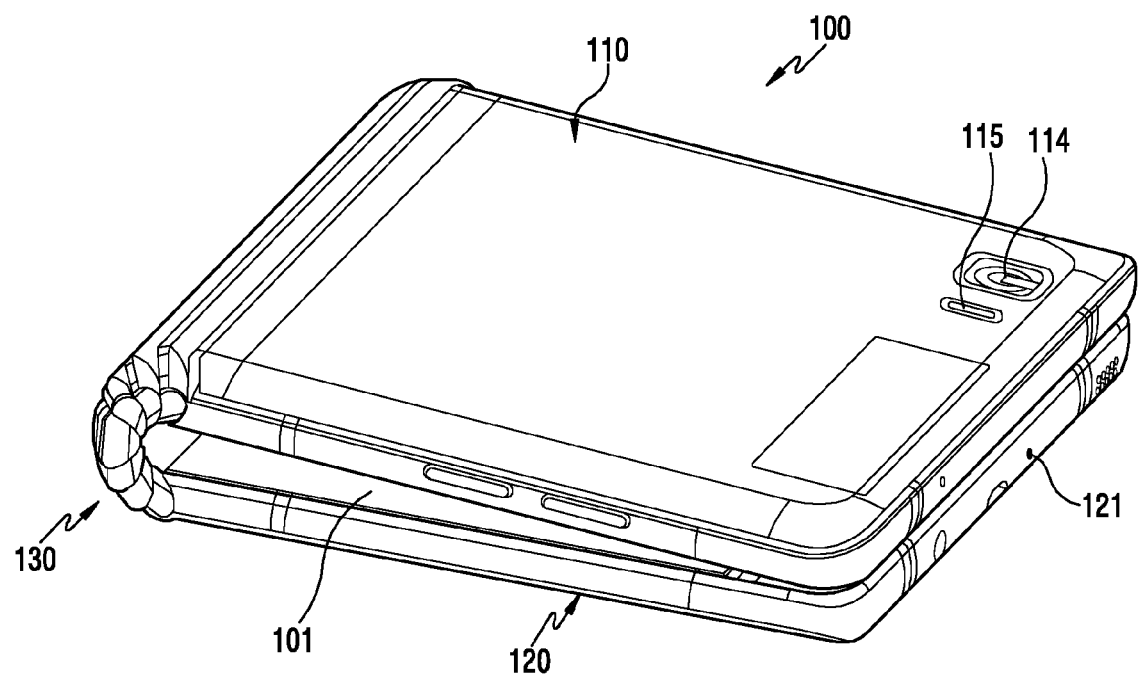
FIG. 1C is a perspective view illustrating a state in which the electronic device of FIG. 1A is completely folded according to an embodiment of the present disclosure.

FIG. 1C is a perspective view illustrating a state in which the electronic device of FIG. 1A is fully folded according to an embodiment of the present disclosure.

Referring to FIG. 1A to FIG. 1C, a foldable (e.g., bendable) type electronic device 100 includes a first body 110 and a second body 120 which is foldable in a rotatable manner about a hinge assembly 130 in the first body 110. According to an embodiment of the present disclosure, the first body 110 and the second body 120 may be foldable to face each other by rotating about an X-axis as a rotation axis by means of the hinge assembly 130, and the first body 110 and the second body 120 may be disposed in general to overlap with each other.

According to an embodiment of the present disclosure, the electronic device 100 may include a flexible display 101 disposed to at least one portion of the second body 120 across the first body 110 and the hinge assembly 130. The flexible display 101 may include a flexible touch screen device including a touch sensor. The flexible display 101 may include a touch sensor and a force sensor. A speaker device 111 may be disposed to an upper portion of the display 101 of the first body 110 to output sound. Components for performing various functions of the electronic device 100 may be disposed in the vicinity where the speaker device 111 is installed. The component may include a camera device 112. The component may include at least one sensor module 113. The sensor module 113 may include, for example, at least one of an illumination sensor (e.g., an optical sensor), a proximity sensor, an infrared sensor, and an ultrasonic sensor. The component may include a light emitting diode (LED) indicator for allowing a user to recognize state information of the electronic device 100. A microphone device 121 may be disposed to a lower portion of the second body 120 to sense ambient sound including a voice of the user. As shown in FIG. 1C, another camera device 113 and a component 115 may be disposed to a rear side of the first body 110 so as to be exposed to the outside even if the electronic device 100 is folded. The component 115 may include at least one of a flash device and a heart rate measurement device.

According to an embodiment of the present disclosure, the flexible display 101 is disposed in the first body 110 and at least one area of the second body 120 across the hinge assembly 130, and thus may be bent together by a folding motion of the electronic device 100. However, since the flexible display 101 may break when it is bent completely, the hinge assembly 130 may be bent to be curved with a specific radius of curvature. The flexible display 101 disposed to an outer surface of the hinge assembly 130 may also be bent in association with the hinge assembly 130.

According to an embodiment of the present disclosure, since the flexible display 101 is not disposed on the same layer in a direction perpendicular to the first body 110, the second body 120, and the hinge assembly 130, a placement position thereof may be changed in general by a curved area of the hinge assembly 130 for a case where the electronic device 100 is fully open and a case where the electronic device 100 is folded. Therefore, the flexible display 101 may be configured to move in a direction (a Y-axis direction) of FIG. 1A in an interlocking manner according to a folding motion of the hinge assembly 130 based on an opening/closing motion of the foldable type electronic device 100.

According to an embodiment of the present disclosure, a display accommodating area 122 may be included in the second body 120. A width of the display accommodating area 122 for accommodating one end of the flexible display 101 may be maximized by an unfolding motion of the hinge assembly 130 in a state where the foldable type electronic device 100 is fully open. However, as the foldable type electronic device 100 is folded, an end portion of the flexible display 101 may be pushed (slid) towards the display accommodating area 122 and thus a width of the display accommodating area 122 may be gradually minimized. Due to an interlocking motion of the flexible display 101 according to an opening/closing motion of the foldable type electronic device 100, the flexible display 101 may be prevented from an unnecessary deformation (e.g., in general, a lifting or curling phenomenon of the flexible display caused by an excessive folding operation in an area corresponding to the hinge assembly) in a specific area irrespective of the opening/closing motion of the foldable type electronic device 100.

According to an embodiment of the present disclosure, as shown in FIG. 1B, since the hinge assembly 130 of the present disclosure may be bent and held in position, a position thereof may be maintained in a self-standing mode as illustrated.

Figure 2:
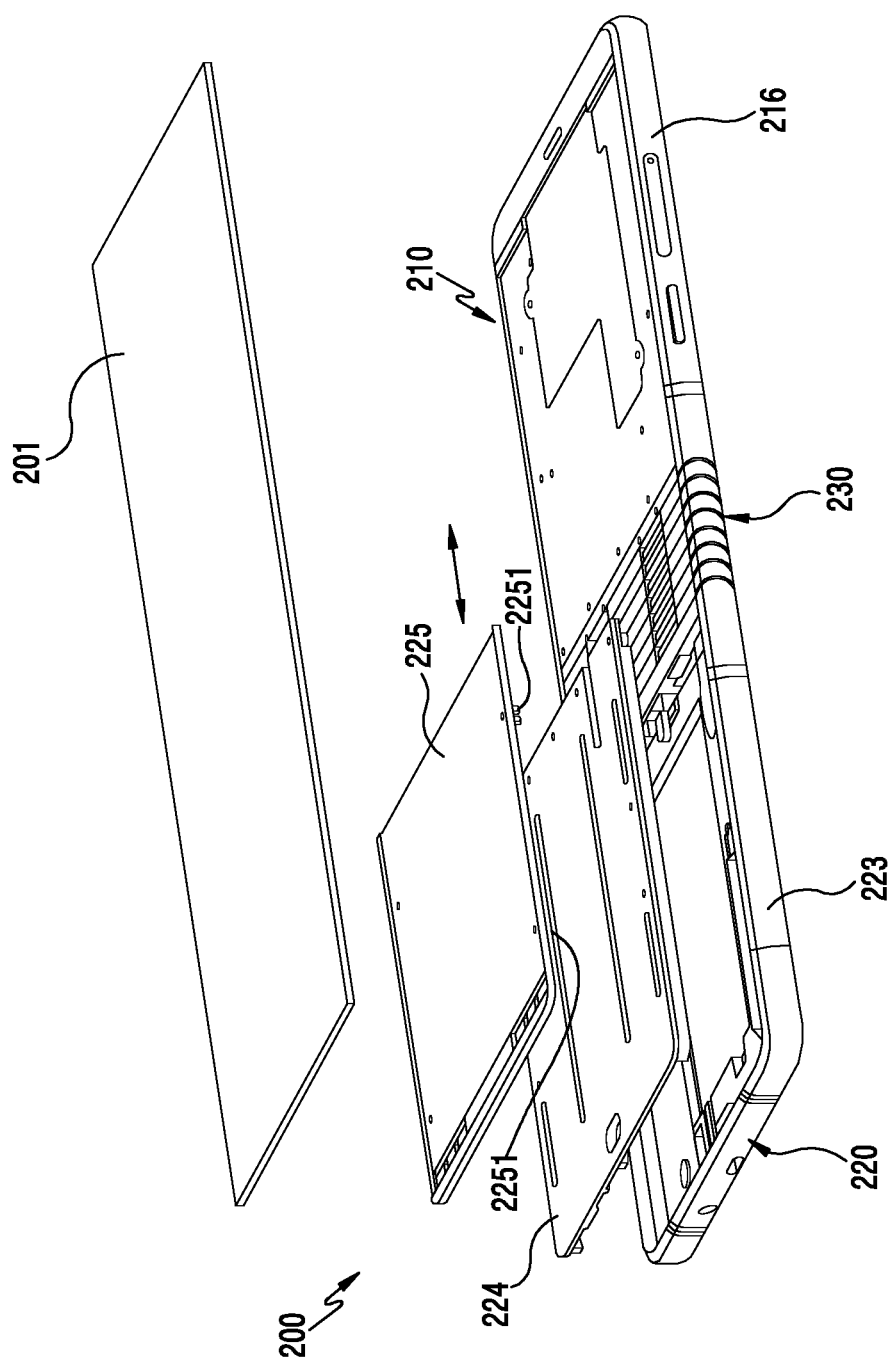
FIG. 2 is an exploded perspective view of a foldable type electronic device according to an embodiment of the present disclosure.

FIG. 2 is an exploded perspective view of a foldable type electronic device according to an embodiment of the present disclosure.

An electronic device 200 of FIG. 2 may be similar to the electronic device 100 of FIG. 1A to FIG. 1C or may be an electronic device according to another embodiment of the present disclosure.

Referring to FIG. 2, the electronic device 200 includes a first body 210 and a second body 220 which is foldable in a rotatable manner about a hinge assembly 230 in the first body 210. The first body 210 includes a first housing 216 for accommodating one area of the flexible display 201. The second body 220 includes a second housing 223 for accommodating other areas of the flexible display 201 disposed across the hinge assembly 230.

According to an embodiment of the present disclosure, the flexible display 201 may be fixed to the first housing 216, and may be disposed to be movable in the second housing 220 depending on an opening/closing motion of the electronic device 200. A bracket 224 may be disposed to an upper portion of the second housing 220. A slide plate 225 which is movable may be disposed to an upper portion of the bracket 224. The flexible display 201 may be configured to be movable by fastening the remaining areas thereof to the slide plate 225. A plurality (e.g., 4) of fastening protrusions 2251 may protrude in a lower portion of the slide plate 225, and the fastening protrusion 2251 may be installed in a plate fastener (925 of FIG. 9) which is fixed in a sliding manner to a second housing (920 of FIG. 9) to be described below by penetrating the bracket 224.

According to an embodiment of the present disclosure, the slide plate 225 may move in a direction indicated by the arrow shown in FIG. 2 in an upper portion of the bracket 224 by interlocking with the hinge assembly 230 which is bent by a specific radius of curvature depending on a folding motion of the electronic device 200. When the hinge assembly 230 is bent in a direction of folding the electronic device 200, the slide plate 225 may slide in a direction of the second body 220, and when the hinge assembly 230 is unfolded in a direction of opening the electronic device 200, the slide plate 225 may slide in a direction of the first body 210.

Hereinafter, an assembly structure for sliding of the slide plate 225 caused by a folding and unfolding motion of the hinge assembly 230 will be described in greater detail.

Figure 3:
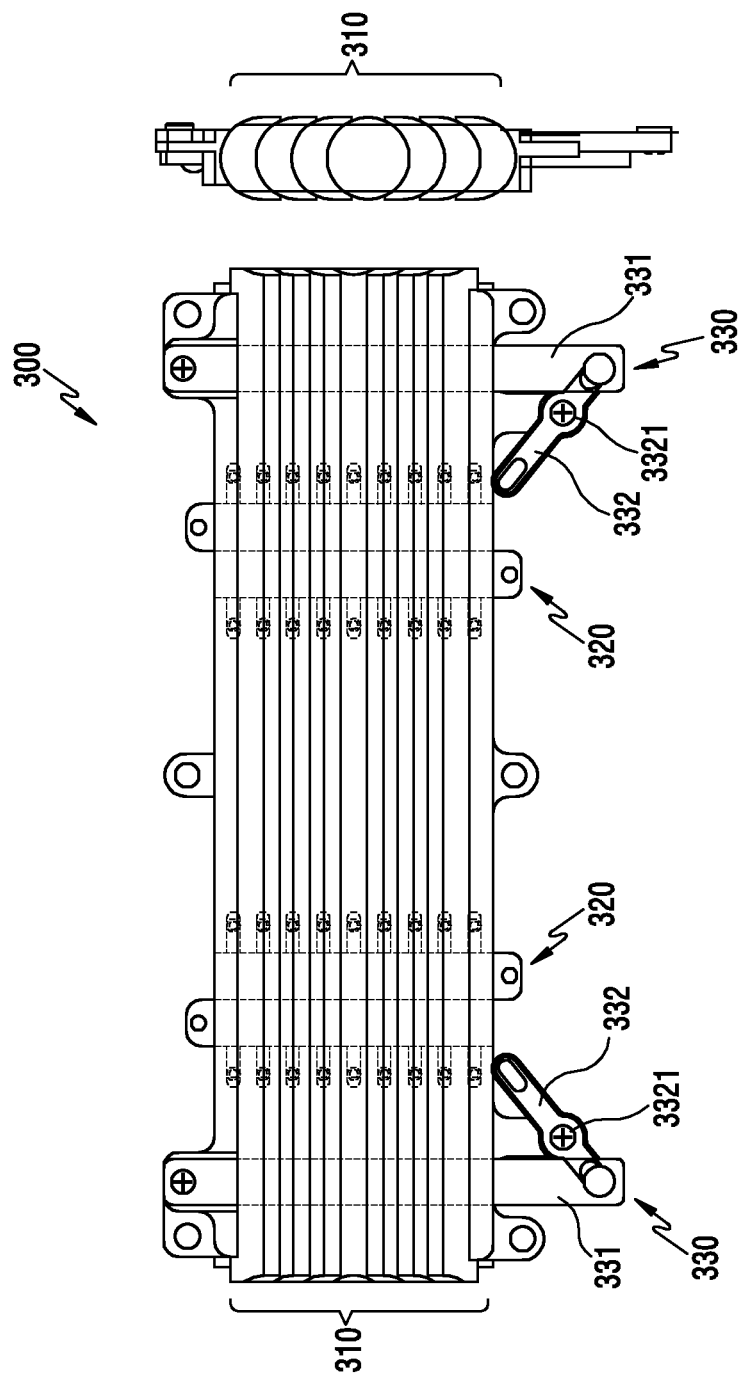
FIG. 3 illustrates a structure of a hinge assembly according to an embodiment of the present disclosure.

FIG. 3 illustrates a structure of a hinge assembly according to an embodiment of the present disclosure.

A hinge assembly 300 of FIG. 3 may be similar to the hinge assembly 130 of FIG. 1A to FIG. 1C or the hinge assembly 230 of FIG. 2 or may be a hinge assembly according to another embodiment of the present disclosure.

Referring to FIG. 3, the hinge assembly includes a multi-bar assembly 310 in which a plurality of unit multi-bars are arranged consecutively, a clutch assembly 320 inserted into the multi-bar assembly 310 to allow each unit multi-bar to be bent in an interlocking manner, and a lever assembly 330 which moves in the interlocking manner depending on a folding motion of the multi-bar assembly 310. According to an embodiment of the present disclosure, as described below, the aforementioned slide plate 225 may be interlocked together by the lever assembly 330 to be interlocked depending on the motion of the multi-bar assembly 310 which is bent under the guidance of the clutch assembly 320, and one area of a flexible display 201 fixed to an upper portion of the slide plate 225 may also move by the interlocking motion.

According to an embodiment of the present disclosure, the hinge assembly 300 includes one pair of clutch assemblies 320 separated by a specific interval in the center of the multi-bar assembly 310. The clutch assembly 320 may be joined to the multi-bar assembly 310 by means of a screw, and may cause unit multi-bars of the multi-bar assembly 310 to mutually bend with a specific radius of curvature.

According to an embodiment of the present disclosure, the lever assembly 330 may be disposed to an outer side of each clutch assembly 320. The lever assembly 330 includes a guide member 331 which moves by a folding motion of the multi-bar assembly 310 and a lever 332 which rotates depending on the movement of the guide member 331. The lever 332 may rotate about a lever rotation axis 3321 so that a linear movement may be induced in a direction opposite to a movement direction of the guide member 331. That is, since the flexible display 101 must move in a direction of a display accommodating area 122 in a second body 120 of the electronic device 100, the lever 332 may induce the movement of the flexible display 101.

According to an embodiment of the present disclosure, although one pair of clutch assemblies 320 having the same structure and one pair of lever assemblies 330 having the same structure are coupled to the multi-bar assembly 310 in the following description, only one clutch assembly 320 and one lever assembly 330 will be described. However, it is apparent that the remaining clutch assembly and the remaining lever assembly also have the same structure. In addition, although a structure in which one pair of clutch assemblies 320 and one pair of lever assemblies 330 are coupled to the multi-bar assembly 310 is illustrated and described, the present disclosure is not limited thereto. For example, one clutch assembly and lever assembly may be disposed, and three or more clutch assemblies and lever assemblies may be disposed.

FIG. 4A to FIG. 4G illustrate a structure of a clutch assembly and an operational relationship of the clutch assembly according to an embodiment of the present disclosure.

Figure 4A:
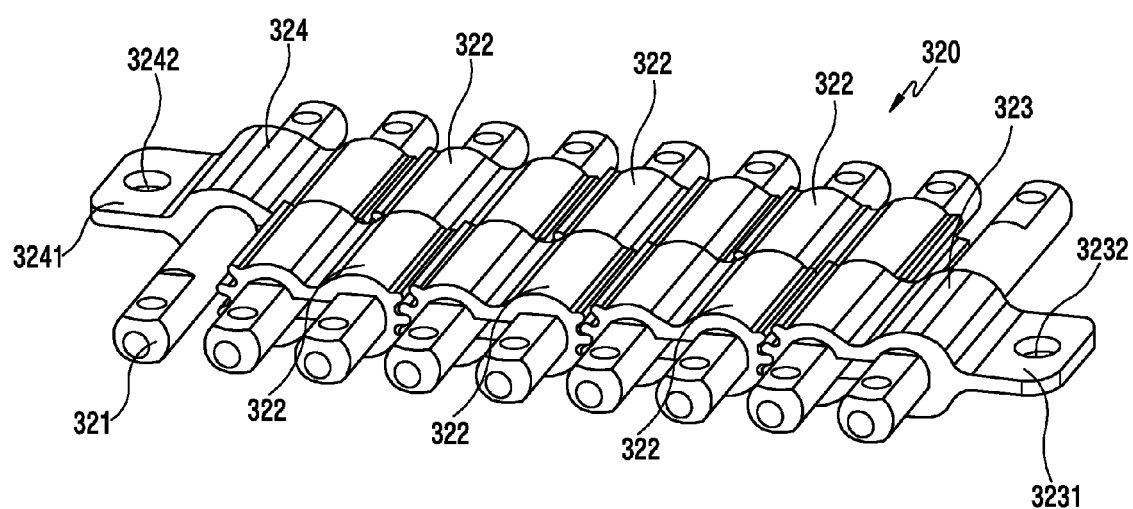
FIG. 4A to FIG. 4G illustrate a structure of a clutch assembly according to an embodiment of the present disclosure.
Figure 4B:
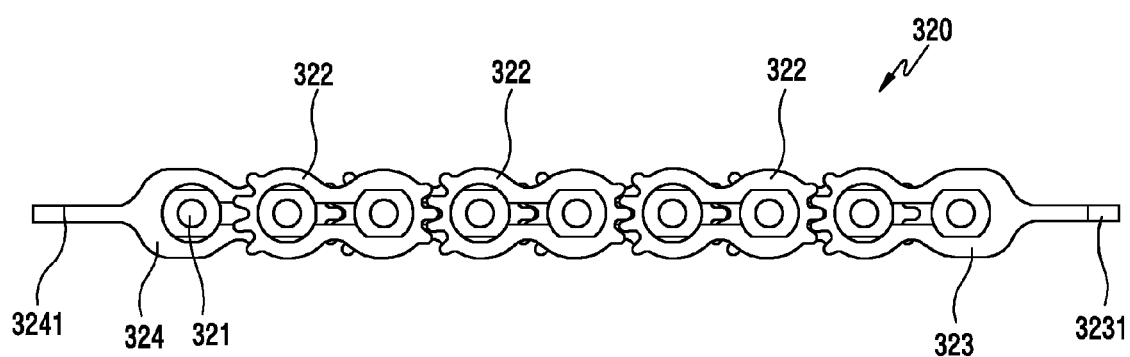

Referring to FIG. 4A and FIG. 4B, the clutch assembly 320 may be assembled such that a plurality of shafts 321 penetrate a plurality of unit clutches 322, 323, and 324. The clutch assembly 320 may be assembled consecutively such that two unit clutches 322 penetrate together through one shaft 321, and thus may be complete as an integral-type assembly which is not separated.

According to an embodiment of the present disclosure, although the unit clutches 322 having the same shape are connected using the shaft 321, the side clutches 323 and 324 disposed to both ends of the clutch assembly 320 may be exposed to the multi-bar assembly 310 to form fastening pieces 3231 and 3241 to be assembled to each housing. The clutch assembly 320 may include the first side clutch 323 disposed to one extreme end and the second side clutch 324 disposed to the other extreme end. The first side clutch 323 may be exposed to one end of the multi-bar assembly 310 and may include the first fastening piece 3231 having a screw through-hole 3232 fixed to a first housing of a first body of the electronic device. The second side clutch 324 may be exposed to the other end of the multi-bar assembly 310, and may include the second fastening piece 3241 having a screw through-hole 3242 fixed to a second housing of a second body of the electronic device. However, each of the side clutches 323 and 324 has the same structure as neighboring unit clutches 322, and thus may operate by interlocking with the unit clutches 322.

Figure 4C:
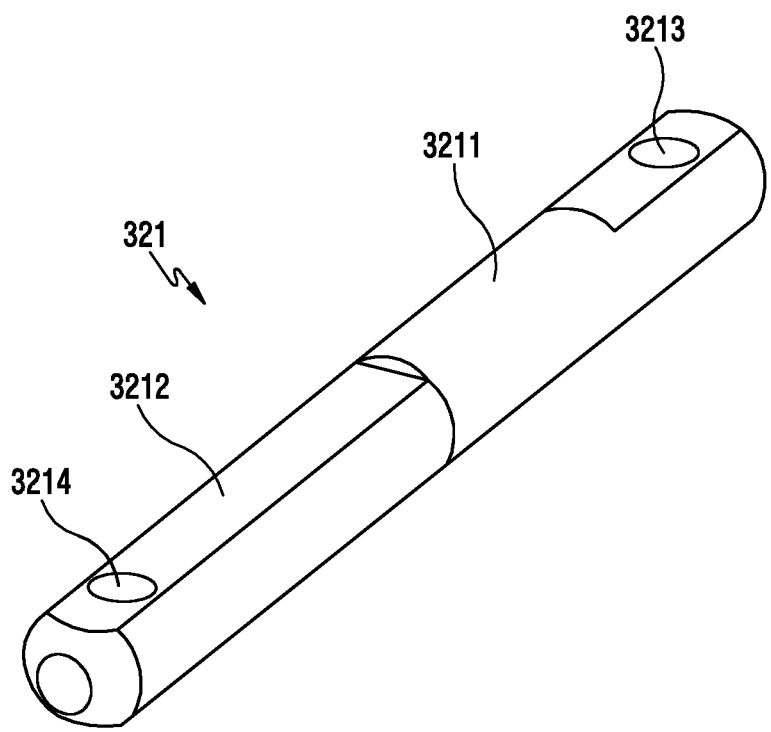
Figure 4D:
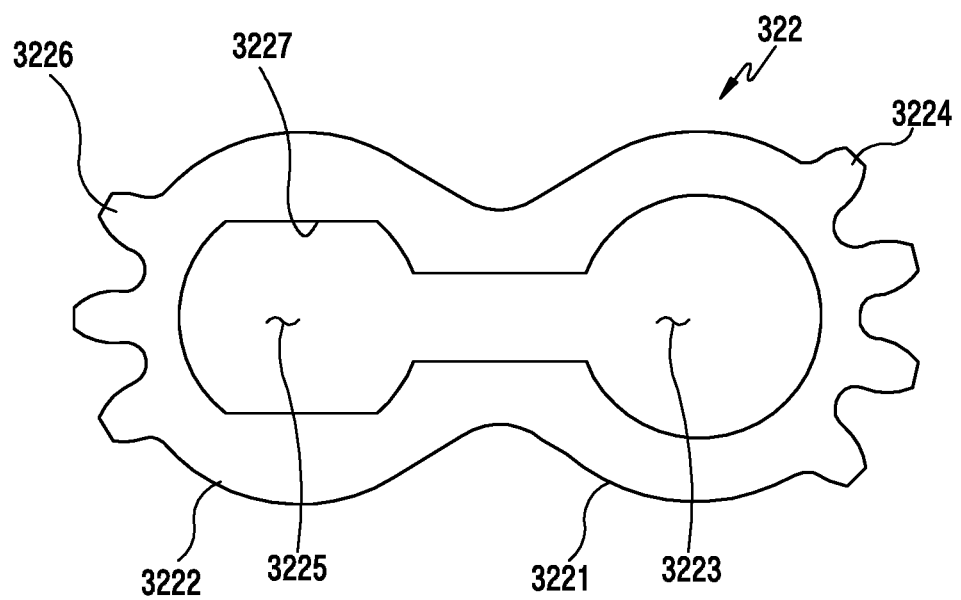

Referring to FIG. 4C and FIG. 4D, the shaft 321 may be formed to have a specific length and different cross-sectional areas. The shaft 321 may include a clutch rotator 3211 having a circular cross-section area and a clutch fastener 3212 which is extended from the clutch rotator 3211 and of which an outer circumferential surface is partially subjected to D-cutting forming a D-shaped cross sectional area. Since screw through-holes 3213 and 3214 are formed to both ends of the shaft 321, the unit clutch 322 may be fixed to a unit multi-bar 311 through screw fastening.

According to an embodiment of the present disclosure, a first shaft accommodating unit 3221 having a first shaft through-hole 3223 and a second shaft accommodating unit 3222 having a second shaft through-hole 3225 may be formed integrally in the unit clutch 322. The clutch rotator 3211 of the shaft 321 may be coupled to the first shaft through-hole 3223 of the unit clutch 322 in a manner which induces self-rotation of the unit clutch 322. The clutch fastener 3212 of the shaft 321 may be coupled to the second shaft through-hole 3225 in a penetrating manner, and thus a cut portion is in contact with a flat portion 3227 of the second shaft through-hole 3225 to prevent self-rotation. The first shaft accommodating unit 3221 of the unit clutch 322 may have a first tooth 3224 along an outer circumferential surface. Therefore, two unit clutches 322 may be assembled together on one shaft 321, and may be engaged with a tooth of another unit clutch 322 assembled on the neighboring shaft 321 to form a specific radius of curvature as a whole, thereby performing a folding motion.

Figure 4E:
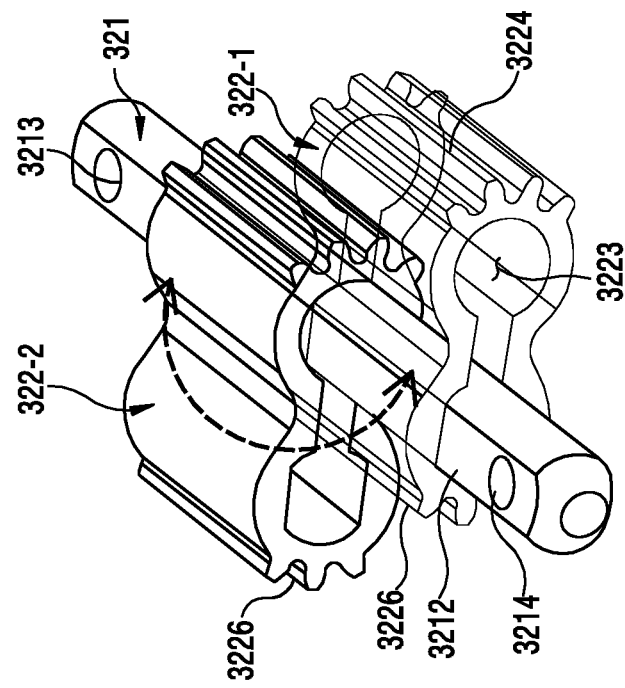
Figure 4E:
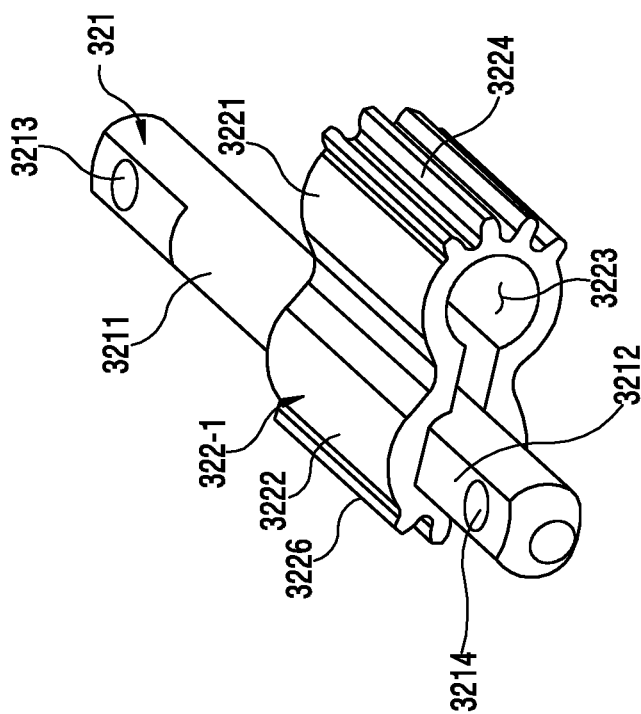

Referring to FIG. 4D and FIG. 4E, a first unit clutch 322-1 may be assembled such that the clutch fastener 3212 of the shaft 321 penetrates the second shaft through-hole 3225. According to an embodiment of the present disclosure, a second unit clutch 322-2 may be assembled such that the clutch rotator 3211 of the shaft 321 penetrates the first shaft through-hole 3223. That is, the first unit clutch 322-1 and the second unit clutch 322-2 may be assembled together on one shaft 321. Therefore, the clutch rotator 3211 of another neighboring shaft 321 may be consecutively assembled to the first shaft through-hole 3223 of the first unit clutch 322-1 in a penetrating manner, and the clutch fastener 3212 of another neighboring shaft 321 may be consecutively assembled to the second shaft through-hole 3222 of the second unit clutch 322-2 in a penetrating manner. Accordingly, the plurality of unit clutches 322 may be consecutively assembled to the shafts 321 without disconnection.

According to an embodiment of the present disclosure, if the unit clutches 322 rotate about an axis, only the second unit clutch 322-2 assembled to the clutch rotator 3211 may self-rotate with respect to the clutch fastener 3212 of the shaft 321. Therefore, a folding motion may be performed in such a manner that the clutch assembly 320 is uniformly curved with a specific radius of curvature by rotating only one unit clutch 322-2 with respect to the remaining clutch 322-1 in one shaft 321.

Figure 4F:
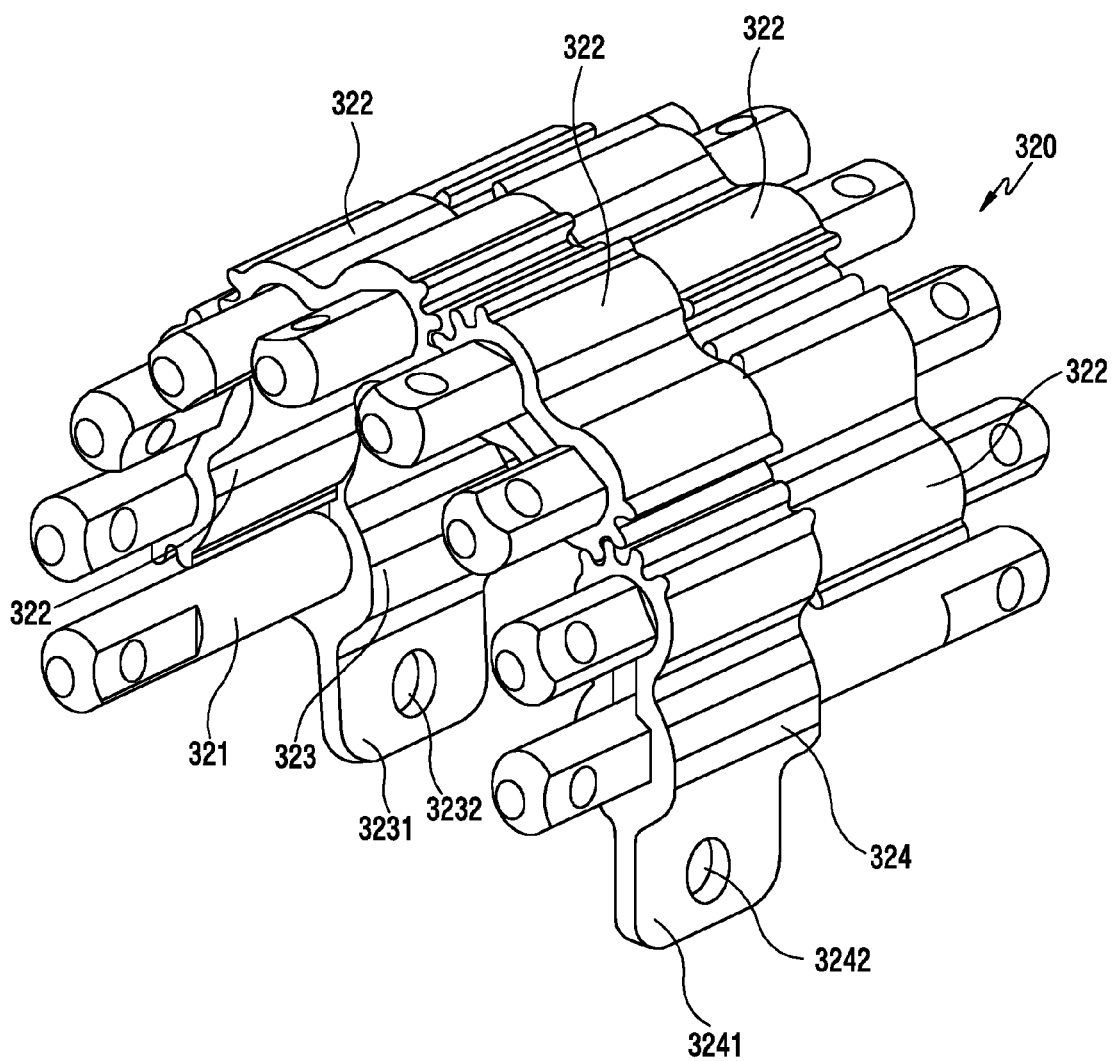

Referring to FIG. 4F, the clutch assembly 320 may be completed by consecutively assembling each of a plurality of shafts 321 to one pair of unit clutches 322 in a penetrating manner. According to an embodiment of the present disclosure, the clutch assembly 320 is configured such that self-rotation is allowed only for one clutch 322 between one pair of unit clutches 322 assembled to one shaft 321, and thus the clutch assembly 320 may be uniformly curved with a specific radius of curvature as a whole.

Figure 4G:
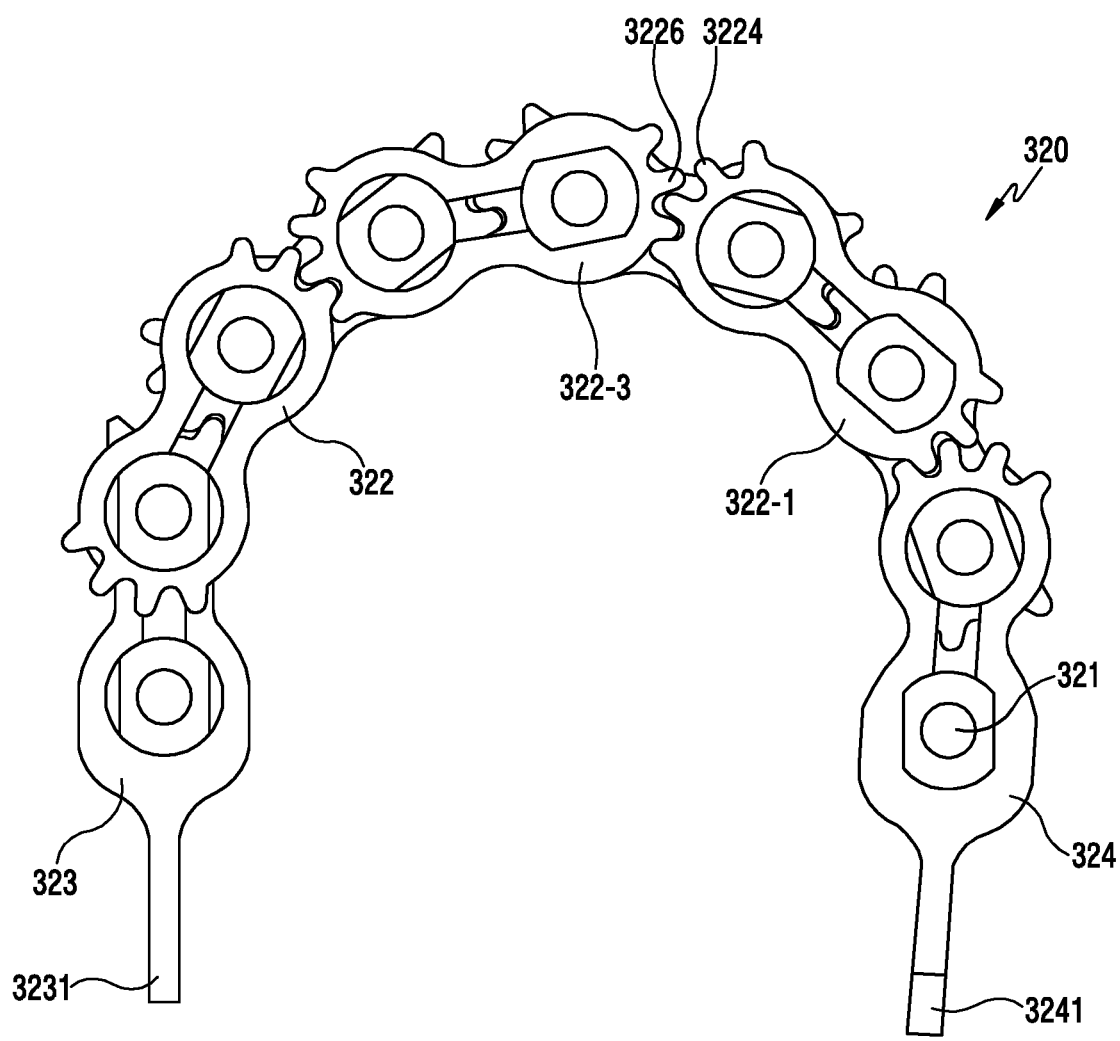

Referring to FIG. 4G, two neighboring shafts 321 may be assembled to one unit clutch 322 of the clutch assembly 320 in a penetrating manner, and each unit clutch 322 may rotate in such a manner that teeth 3224 and 3226 protruding on respective outer circumferential surfaces are engaged with each other. Therefore, a folding motion may be performed such that the clutch assembly 320 is uniformly curved with a specific radius of curvature by the engagement of the teeth 3224 and 3226. According to an embodiment of the present disclosure, the first tooth 3224 shape of the first unit clutch 322-1 assembled to the shaft 321 may be assembled to be engaged with the second tooth 3226 shape of a third unit clutch 322-3, and the remaining teeth may also be engaged in the same manner in the remaining unit clutches 322 and the respective side clutches 323 and 324.

FIG. 5A to FIG. 5E illustrate a structure of a multi-bar assembly according to an embodiment of the present disclosure.

Figure 5A:
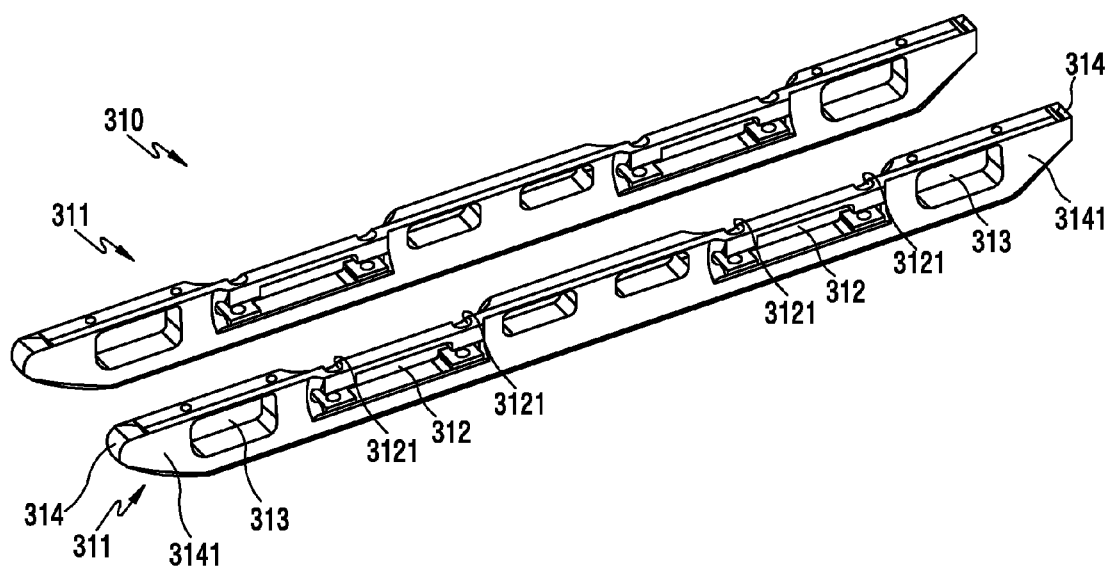
FIG. 5A to FIG. 5E illustrate a structure of a multi-bar assembly according to an embodiment of the present disclosure.

Referring to FIG. 5A, a plurality of unit multi-bars 311 constituting the multi-bar assembly 310 may be formed in general in the same shape. According to an embodiment of the present disclosure, the unit multi-bar 311 includes one pair of clutch assembly through-holes 312 separated by a specific interval in the center to accommodate each unit clutch 322 of the clutch assembly 320. Both ends of the clutch assembly through-hole 312 may be formed of a screw fastening hole 3121 capable of fastening a screw which penetrates the screw through-holes 3213 and 3214 formed on each shaft 321 of the clutch assembly 320 to be penetrated. A guide member through-hole 313 may be formed in the vicinity of each clutch assembly through-hole 312. The unit multi-bar 311 may have both ends 314 formed in a curved shape and exposed to the outside of the electronic device. Both ends of the unit multi-bar 311 include a first curved portion 3141 which is curved inwardly. The first curved portion 3141 may be formed with a mutually corresponding shape so that a contact area is made with respect to a second curved portion 3142 having a curved shape formed on an outer circumferential surface of the neighboring unit multi-bar 311. Accordingly, in a state where the multi-bar assembly 310 is fully unfolded, both ends of each unit multi-bar 311 may be disposed to be close in contact with each other.

Figure 5B:
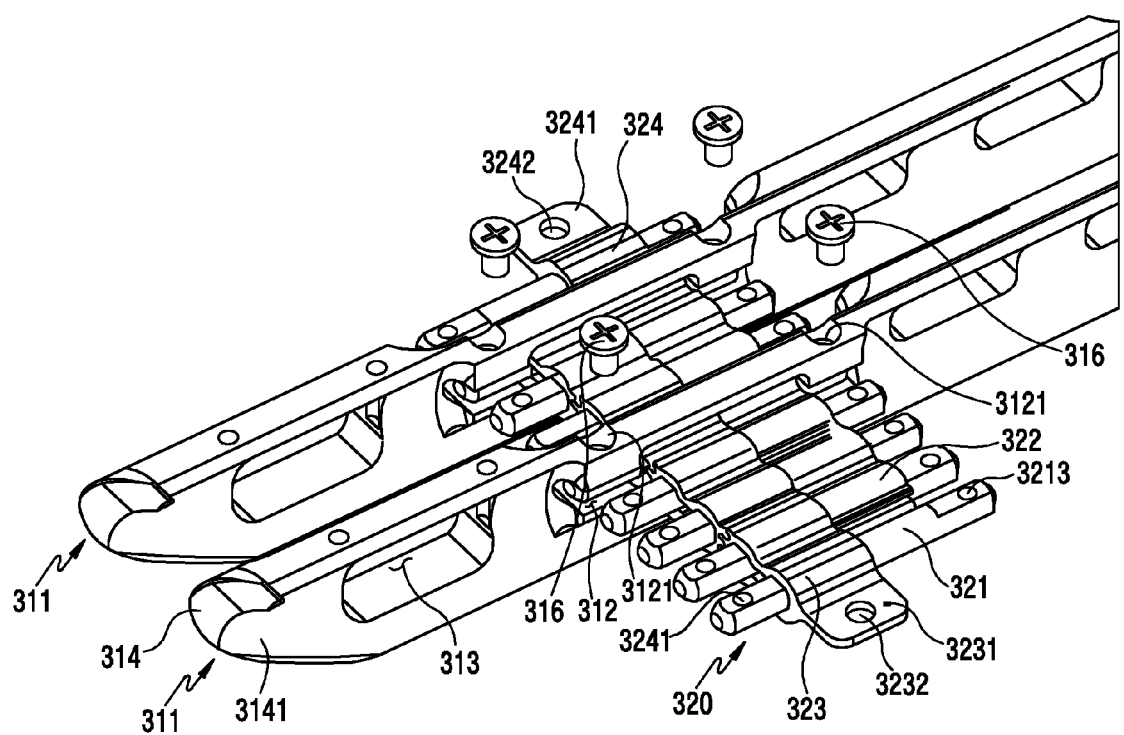

Referring to FIG. 5B, the plurality of multi-bar assemblies 310 includes the clutch assembly 320 which is completely assembled through the clutch assembly through-hole 312. According to an embodiment of the present disclosure, a screw 316 penetrating the screw through-holes 3213 and 3214 formed on both ends of the respective shafts 321 of the clutch assembly 320 is engaged to the screw fastening hole 3121 formed on both ends of the clutch assembly through-hole 312 of each unit multi-bar 311. However, the present disclosure is not limited thereto, and thus riveting may be used instead of screw fastening, or a self-mechanical structure (e.g., a snap-fit coupling structure and the like) may be used. If the clutch assembly 320 is bent to be curved with a specific radius of curvature by a mutually rotating motion of the first and second bodies of the electronic device, the multi-bar assembly 310 may also be bent to be curved with the same radius of curvature. Since the unit multi-bars 311 are fixed to the respective shafts 321, the number of the respective unit multi-bars 311 may be the same as the number of shafts 321.

Figure 5C:
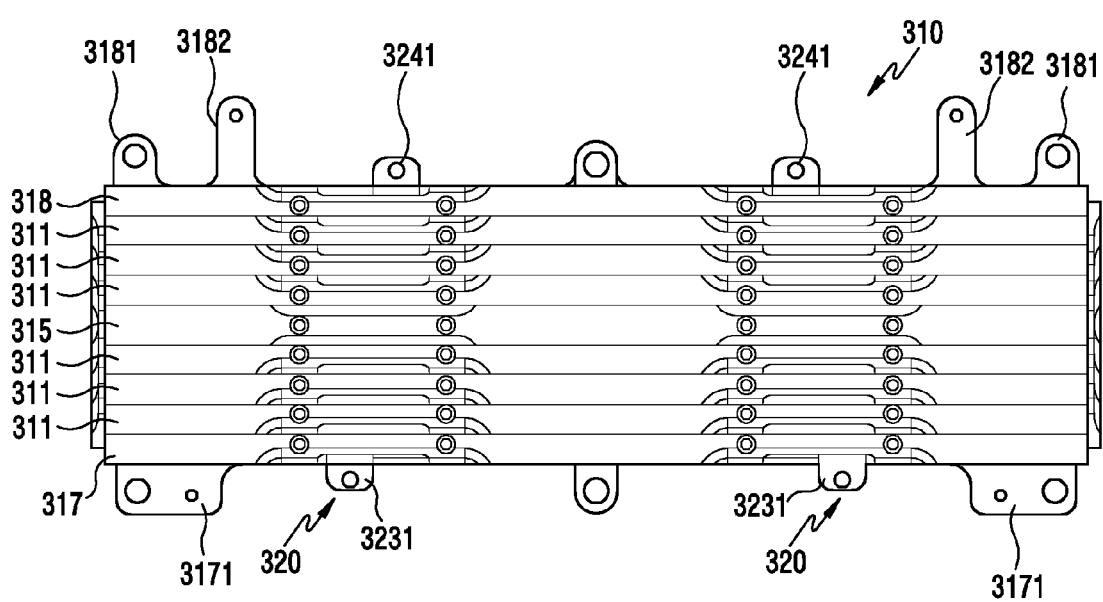

Referring to FIG. 5C, the multi-bar assembly 310 includes a plurality of unit multi-bars 311, side multi-bars 317 and 318 disposed to both ends of the multi-bar assembly 310, and a center multi-bar 315. According to an embodiment of the present disclosure, the center multi-bar 315 may have an end portion formed in a circular shape and exposed to the outside of the electronic device, and the end portion of each multi-bar 311 may be formed in a semi-circular shape in which a contact area may be equally achieved with respect to the center multi-bar 315. The multi-bar assembly 310 may also be fixed to first and second housings of the electronic device. The multi-bar assembly 310 includes the first side multi-bar 317 fixed to the first body of the electronic device and the second side multi-bar 318 fixed to the second body of the electronic device. The first side multi-bar 317 includes a first body fastening piece 3171 fixed to a proper position of the first body and a second body fastening piece 3181 fixed to a proper position of the second body. The second side multi-bar 318 may have the lever fastener 3182 for fixing a lever 332 rotatable in a protruding manner in a direction of the second body.

According to an embodiment of the present disclosure, the multi-bar assembly body 310 when completely assembled may be disposed such that the first fastening piece 3231 of the clutch assembly 320 protrudes in a direction of the first body of the electronic device and the second fastening piece 3241 protrudes in a direction of the second body of the electronic device. Therefore, the first body fastening piece 3171 protruding from the first side multi-bar 317 of the multi-bar assembly 310 and the first fastening piece 3231 of the clutch assembly 320 may be fixed to the first housing of the first body of the electronic device. The second body fastening piece 3181 protruding from the second side multi-bar 318 of the multi-bar assembly 310 and the second fastening piece 3141 of the clutch assembly 320 may be fixed to the second housing of the second body of the electronic device.

Figure 5D:
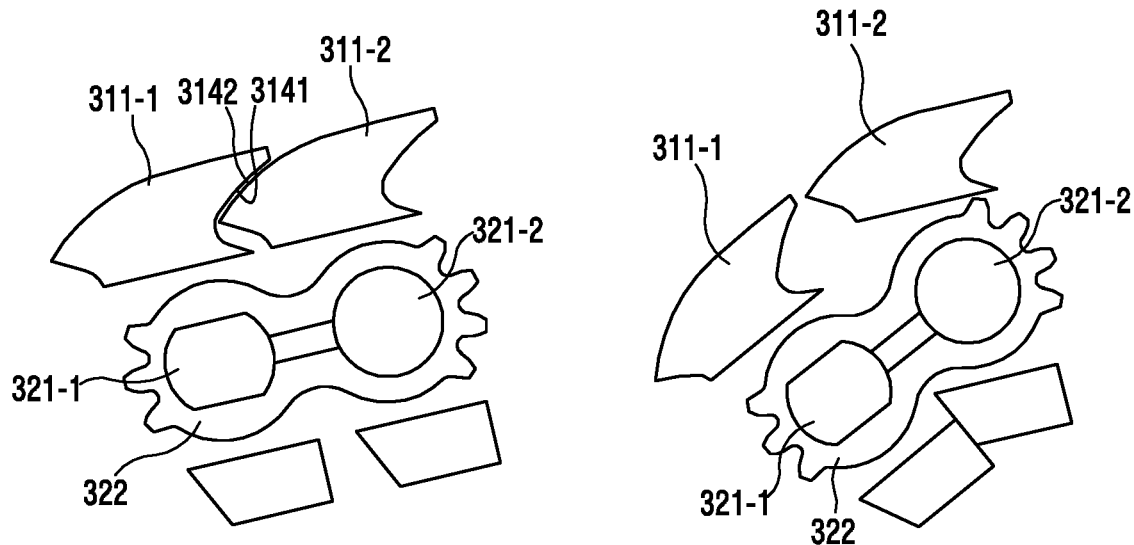
Figure 5E:
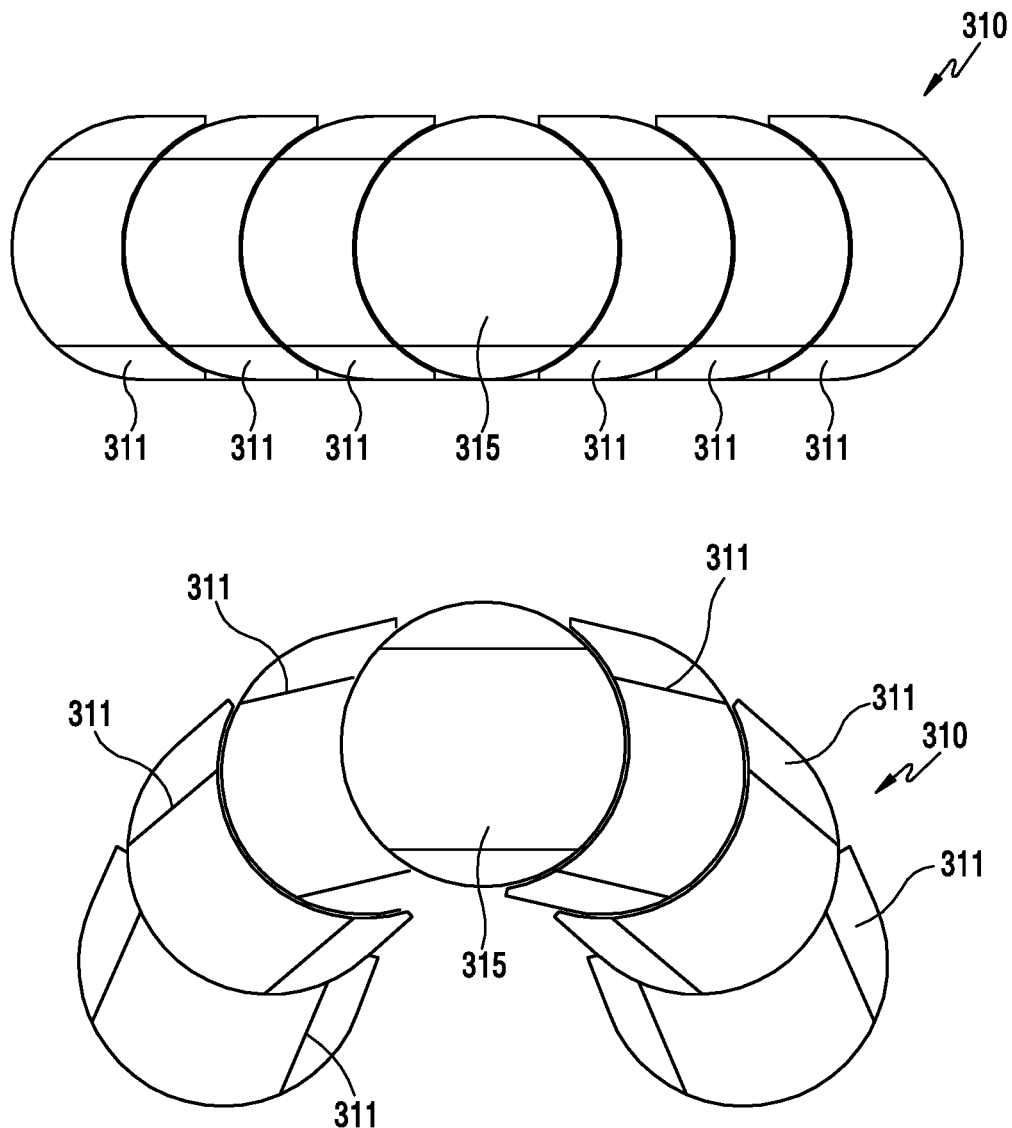

Referring to FIG. 5D and FIG. 5E, the unit multi-bar 322 corresponding to each shaft 321 of the clutch assembly 320 may be bent with a specific radius of curvature by the unit clutch 322 for rotating the shaft 321 about a rotation axis. According to an embodiment of the present disclosure, if the first unit multi-bar 311-1 and the second unit multi-bar 311-2 are in a parallel state (if the multi-bar is not bent), a contact area may be at least partially achieved such that the first curved portion 3141 formed on an inner surface of the first unit multi-bar 311-1 and the second curved portion 3142 formed on an outer surface of the second unit multi-bar 311-2 are shaped to match each other. If one portion of the unit clutch 322 coupled to the second shaft 321-2 with respect to the first shaft 321-1 rotates, the first curved portion 3141 of the first unit multi-bar 311-1 and the second curved portion 3142 of the second unit multi-bar 311-2 may be separated from each other while rotating with a specific radius of curvature. Therefore, the plurality of unit multi-bars 311 may rotate to be uniformly curved with a specific radius of curvature in both directions with respect to the center multi-bar 315 in the center by the rotation of the unit clutch 322 installed in a rotatable manner in the corresponding shaft 321.

Figure 6A:
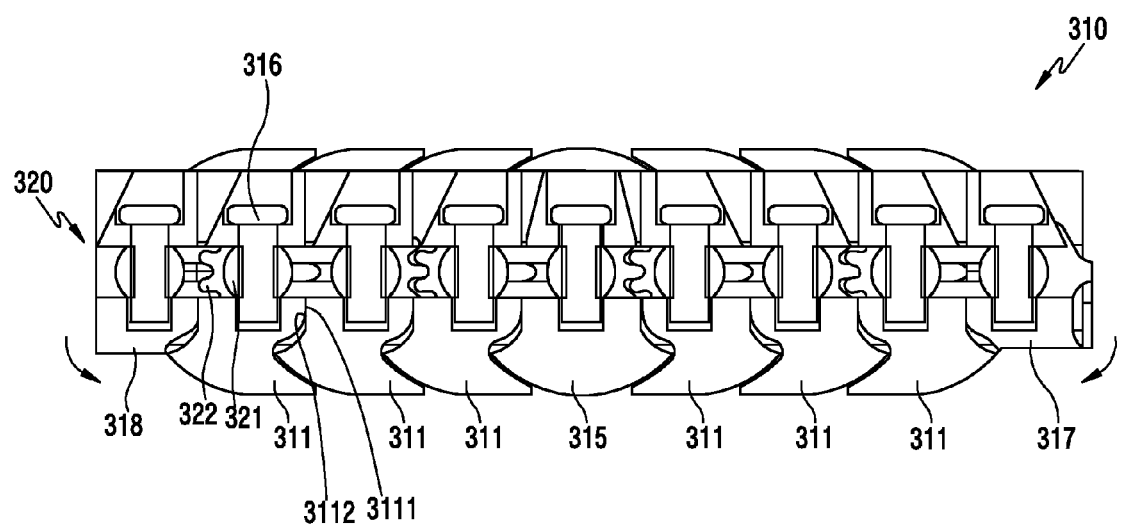
FIG. 6A and FIG. 6B illustrate an operational relationship of a multi-bar assembly according to an embodiment of the present disclosure.
Figure 6B:
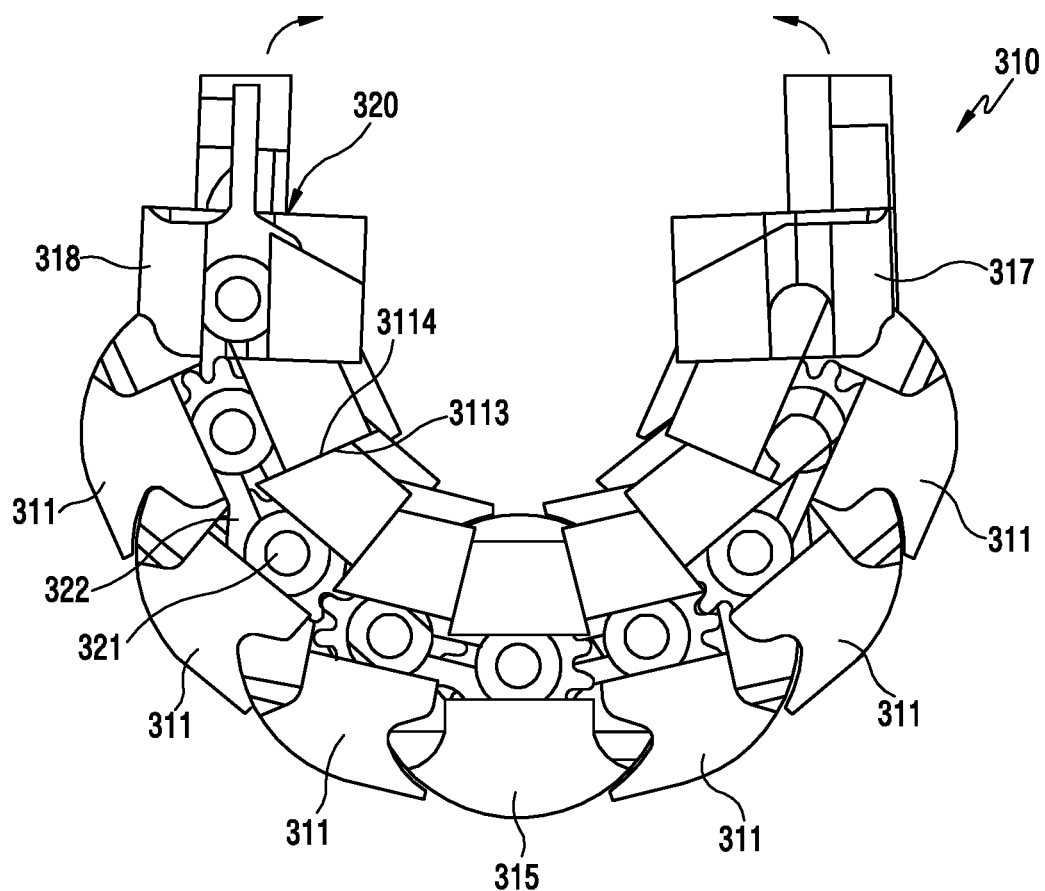

FIG. 6A and FIG. 6B illustrate an operational relationship of a multi-bar assembly according to an embodiment of the present disclosure.

Referring to FIG. 6A, the unit multi-bar 311 and the side multi-bars 317 and 318 are disposed with respect to the center multi-bar 315, and are fixed by fastening the screw 316 to each shaft 321 of the clutch assembly 320 to construct the unit multi-bar 311. According to an embodiment of the present disclosure, in FIG. 6A, the multi-bar assembly 310 maintains a state of not being bent, that is, the state as shown in FIG. 1A. In this case, a phenomenon in which the multi-bar assembly 310 is bent more in the direction indicated by the arrow (being bent in a reverse direction past being flat) may be prevented by bringing a first surface 3111 and a second surface 3112, which are formed vertically to each unit multi-bar 311, in contact with each other.

In FIG. 6B, the multi-bar assembly 310 maintains a state of being fully bent, that is, the state as shown in FIG. 1C. In this case, a phenomenon in which a flexible display is excessively folded may be prevented by bringing a third surface 3113 and a fourth surface 3114, which are formed vertically to each unit multi-bar 311, in contact with each other to prevent being bent any more in the direction indicated by the arrow.

FIG. 7A to FIG. 7E illustrate a state where a guide member is applied to a multi-bar assembly according to an embodiment of the present disclosure.

Figure 7A:
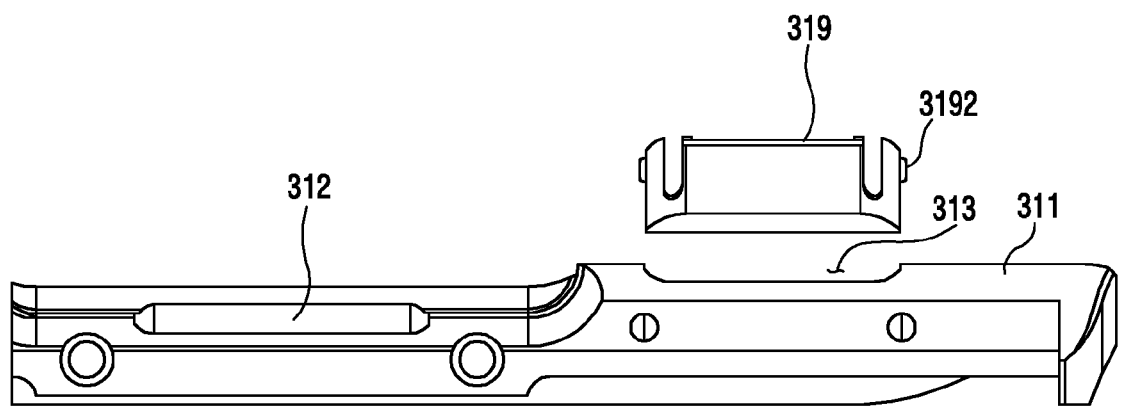
FIG. 7A to FIG. 7E illustrate a state in which a guide member is applied to a multi-bar assembly according to an embodiment of the present disclosure.
Figure 7B:
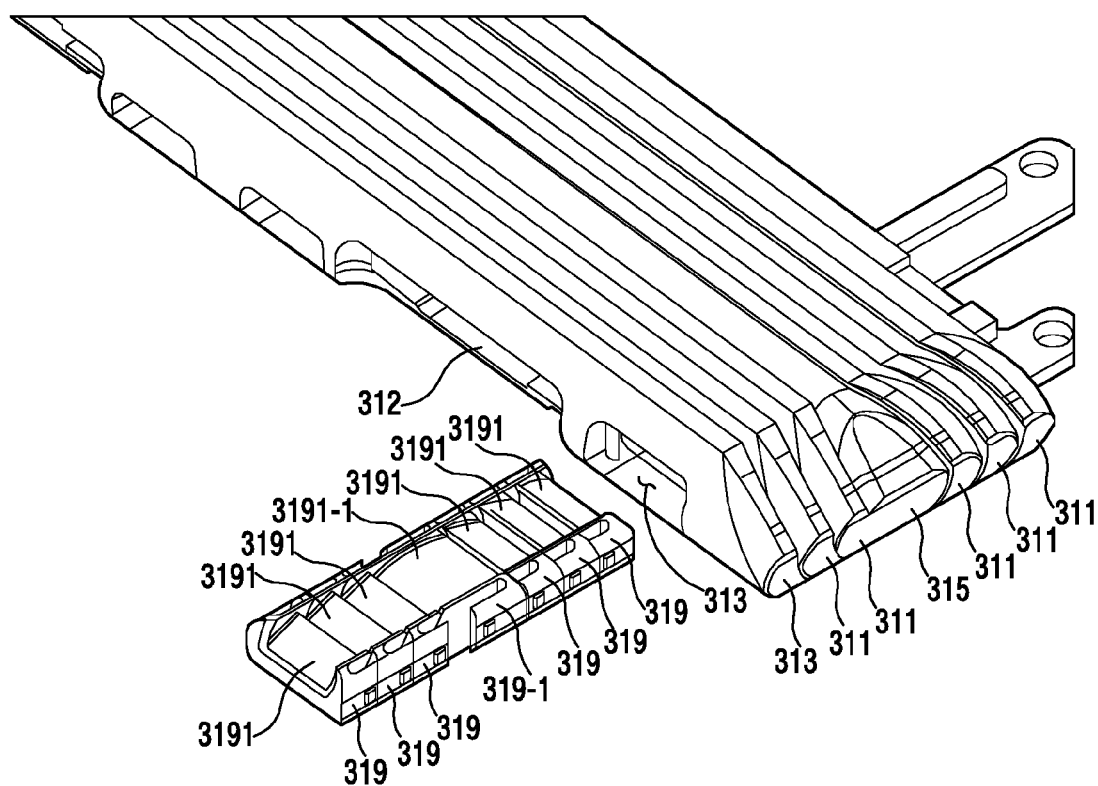
Figure 7C:
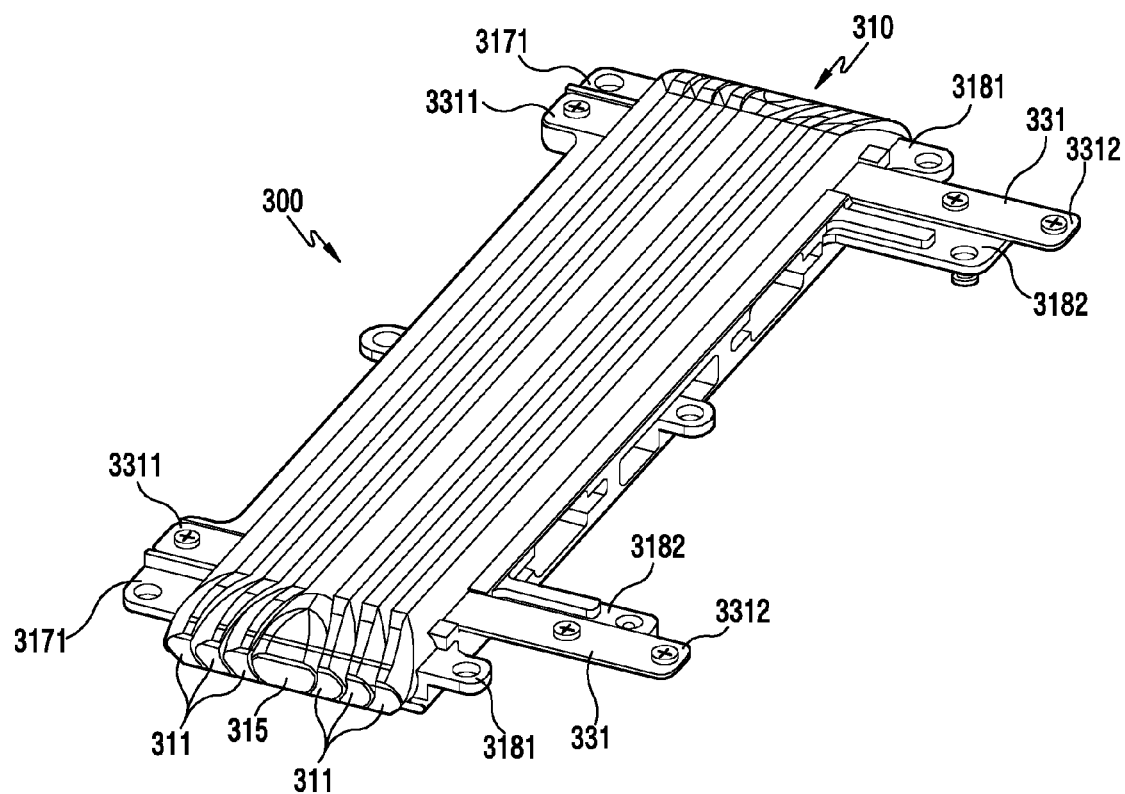
Figure 7D:
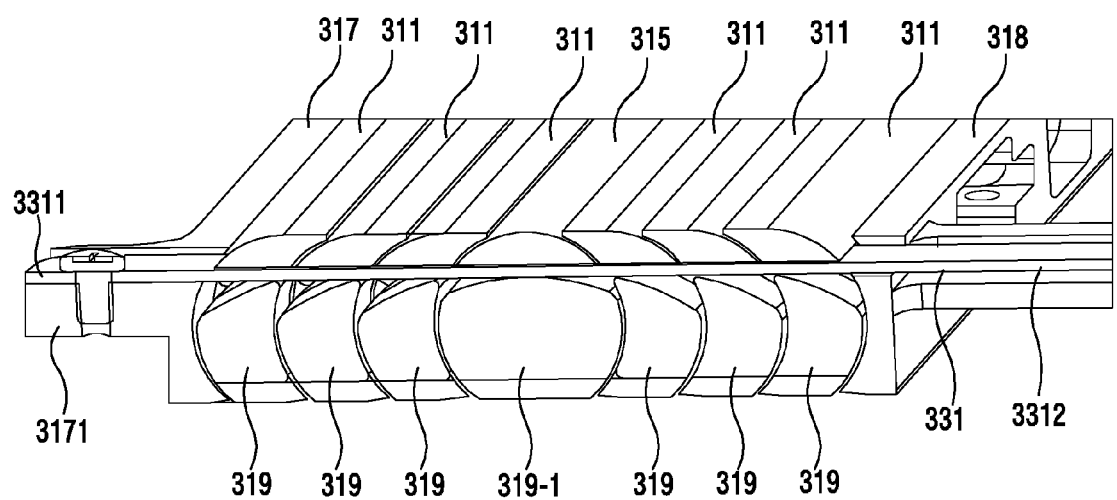
Figure 7E:
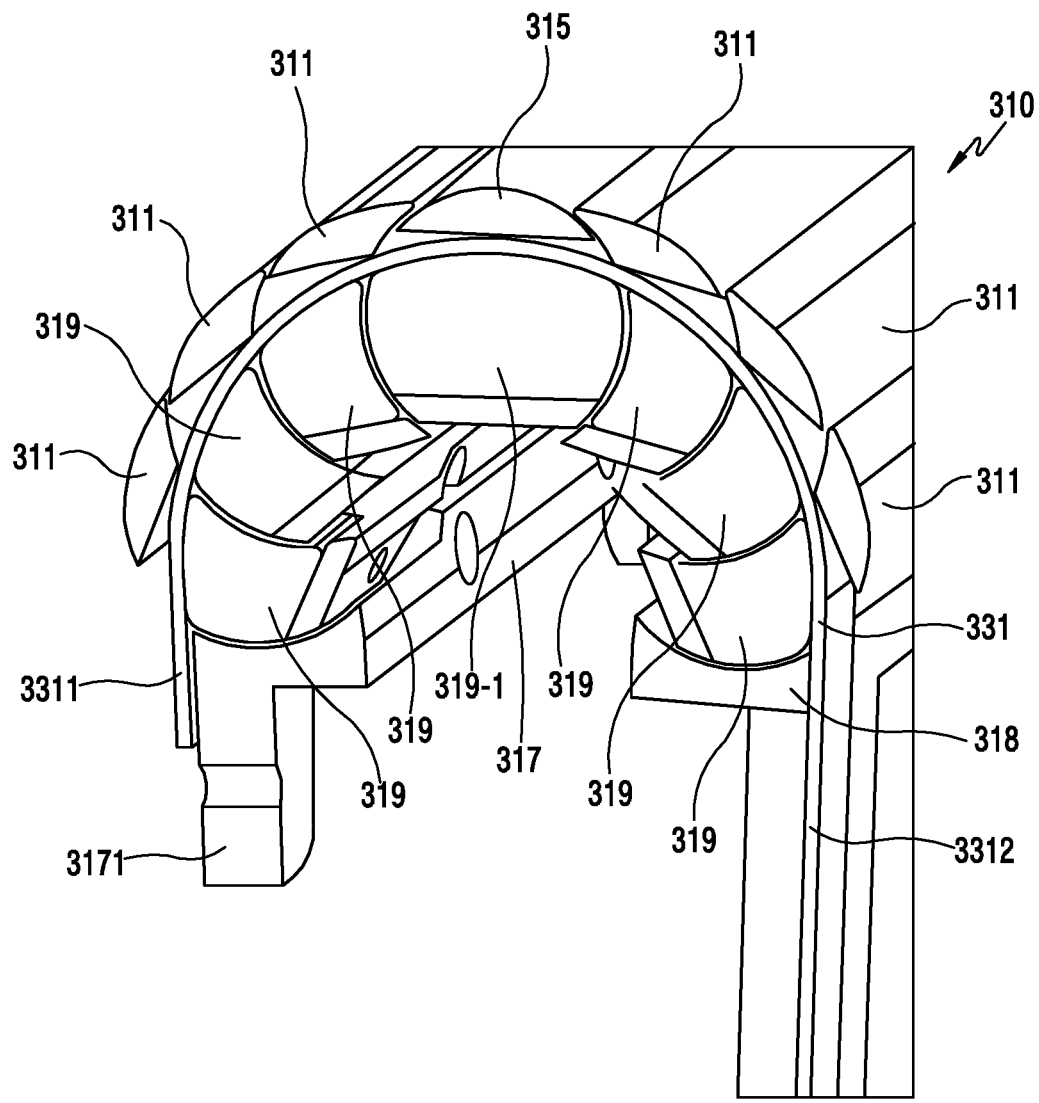

Referring to FIG. 7A and FIG. 7E, the guide member 331 may be installed in such a manner that the guide member 331 penetrates the guide member through-hole 313 of the multi-bar assembly 310. According to an embodiment of the present disclosure, the guide member 331 may be installed to be guided by the unit support member 319 placed in the guide member through-hole 313 formed on each unit multi-bar 311. The unit support member 319 may be formed in a shape corresponding to the guide member through-hole 313 formed on each unit multi-bar 311. A center support member 319-1 located in the center of the plurality of unit support members 319 may be formed in a shape corresponding to the guide member through-hole 313 of the center multi-bar 315 disposed to the center of the multi-bar assembly 310. The unit support member 319 may be fixed in such a manner that a protrusion 3192 having a hook shape is formed at both ends thereof and the protrusion is mounted on a concave notch formed at a location corresponding to an inner surface of the guide member through-hole 313 of the unit multi-bar 311. The unit support member 319 includes a recess 3191 formed to be lower than an outer surface to guide the guide member 331. The recess 3191 may be formed to have a depth and/or width capable of sufficiently accommodating the guide member 331.

As shown in FIG. 7B, corresponding unit support members 319 may be assembled to the guide member through-hole 313 of each unit multi-bar 311 of the multi-bar assembly 310. Thereafter, as shown in FIG. 7C, the guide member 331 may be installed in the multi-bar assembly 310 in a penetrating manner under the guidance of the recess 3191 formed on each of the unit support members 319. According to an embodiment of the present disclosure, the guide member 331 may be formed as a metal plate (e.g., stainless steel), but the present disclosure is not limited thereto. For example, the guide member may be formed of a soft synthetic resin material.

According to an embodiment of the present disclosure, a fastening end 3311 of the guide member 331 penetrating the multi-bar assembly 310 may be fixed to the first body fastening piece 3171 formed on the first side multi-bar 317. A free end 3312 facing the fastening end 3311 of the guide member 331 may protrude in a direction of the second body fastening piece 3181 by a specific length by penetrating the second side multi-bar 318.

FIG. 7D and FIG. 7E are cross-sectional views. FIG. 7D illustrates an unfolded state and FIG. 7E illustrates a folded state of the multi-bar assembly 310.

As illustrated in FIGS. 7D and 7E, when the multi-bar assembly 310 is bent (e.g., when the electronic device is folded), regarding the guide member 331, the free end 3312 of the guide member 331 disposed in a direction facing the fastening end 3311 fixed to the first body fastening piece 3171 of the first side multi-bar 317 may move in a direction of the multi-bar assembly 310. On the contrary, when the bent multi-bar assembly 310 is unfolded (e.g., when the electronic device is opened), the free end 3312 of the guide member 331 may move in a direction opposite to the multi-bar assembly 310 with respect to the fastening end 3311. That is, the guide member 331 may perform a reciprocal movement according to an unfolding and folding motion of the multi-bar assembly 310.

Figure 8B:
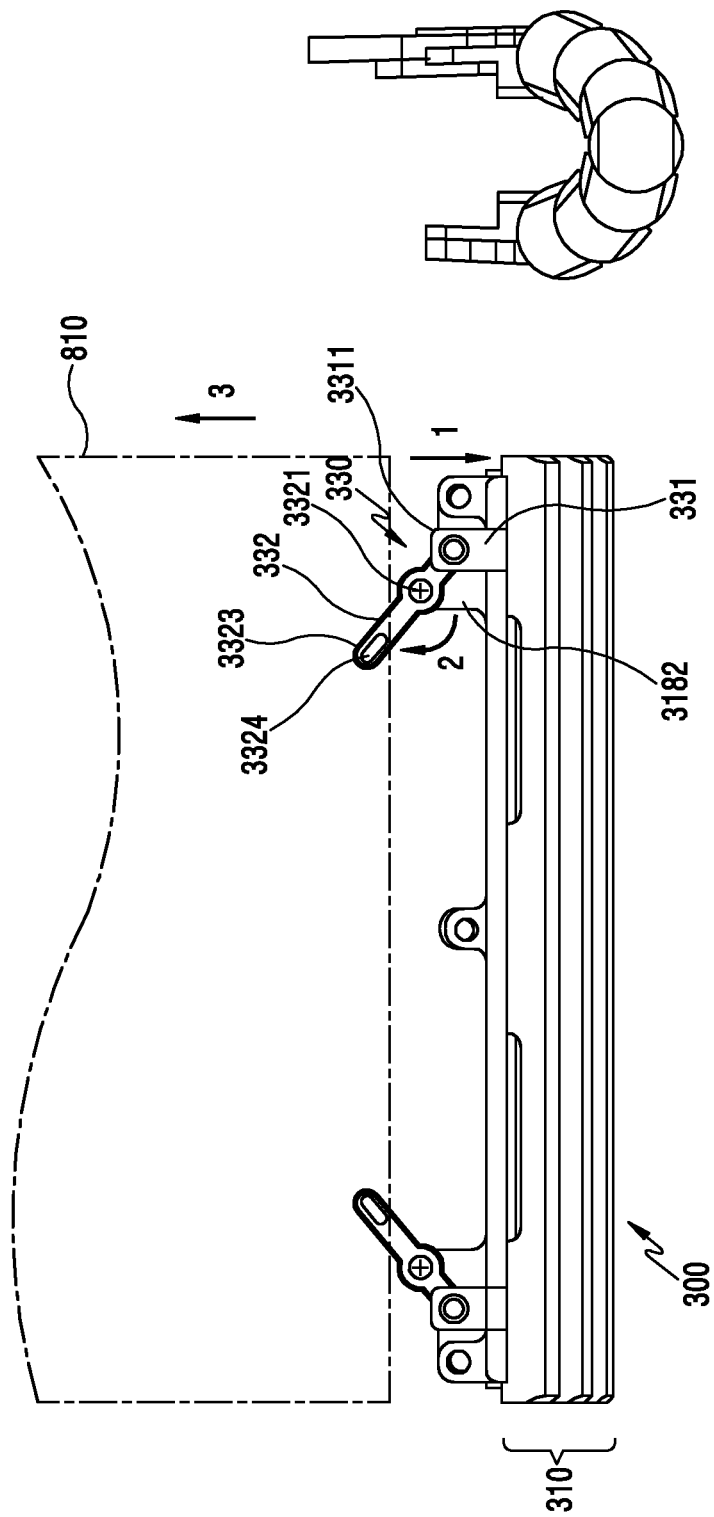

FIG. 8A to FIG. 8B illustrate an operational relationship of a flexible display interlocking with a lever assembly operating based on a folded state of a hinge assembly according to an embodiment of the present disclosure.

Referring to FIG. 8A, the hinge assembly 300 includes the lever assembly 330 interlocking with the guide member 331 which moves based on an unfolding and folding motion of the multi-bar assembly 310. According to an embodiment of the present disclosure, the lever assembly 330 includes the guide member 331 and the lever 332 fixed in a rotatable manner to a lever support portion 3182 of the multi-bar assembly 310. The lever 332 includes a first end 3322 fixed to the free end 3312 of the guide member 331 in a rotatable manner at one end about a lever rotation axis 3321 installed in the lever support portion 3182, and a second end 3323 fixed in a manner of interlocking with a slide plate 810 at the other end about the lever rotation axis 3321. A long hole 3324 may be formed on the second end 3323 so that a rotation movement of the lever 332 causes a linear movement of the slide plate 810. The slide plate 810 may have a similar structure to the slide plate 225 of FIG. 2, and may be disposed in such a manner that one area of the flexible display is fixed to an upper portion of the slide plate 810.

According to an embodiment of the present disclosure, the guide member 331 may move by an unfolding and folding motion of the hinge assembly 300. The lever 332 rotates depending on the movement of the guide member 331, and the slide plate 810 moves by the rotation of the lever 332. As a result, the flexible display disposed to the second body of the electronic device may move in an interlocking manner. That is, the lever 332 may facilitate a smooth movement of the flexible display on the basis of the motion of the hinge assembly 300 by defining a movement direction of the slide plate 810 in a direction opposite to a movement direction of the guide member 331.

Referring to FIG. 8B, when the hinge assembly 300 is bent (e.g., when the electronic device is folded), the guide plate 810 may move in a direction in which the free end 3312 is illustrated with respect to the fastening end 3311. The lever 332 may rotate in a direction 2 about the lever rotation axis 3321 in an interlocking manner, and the slide plate 810 may move in a direction 3 in an interlocking manner. That is, the flexible display may also move depending on the movement of the slide plate 810.

Figure 9:
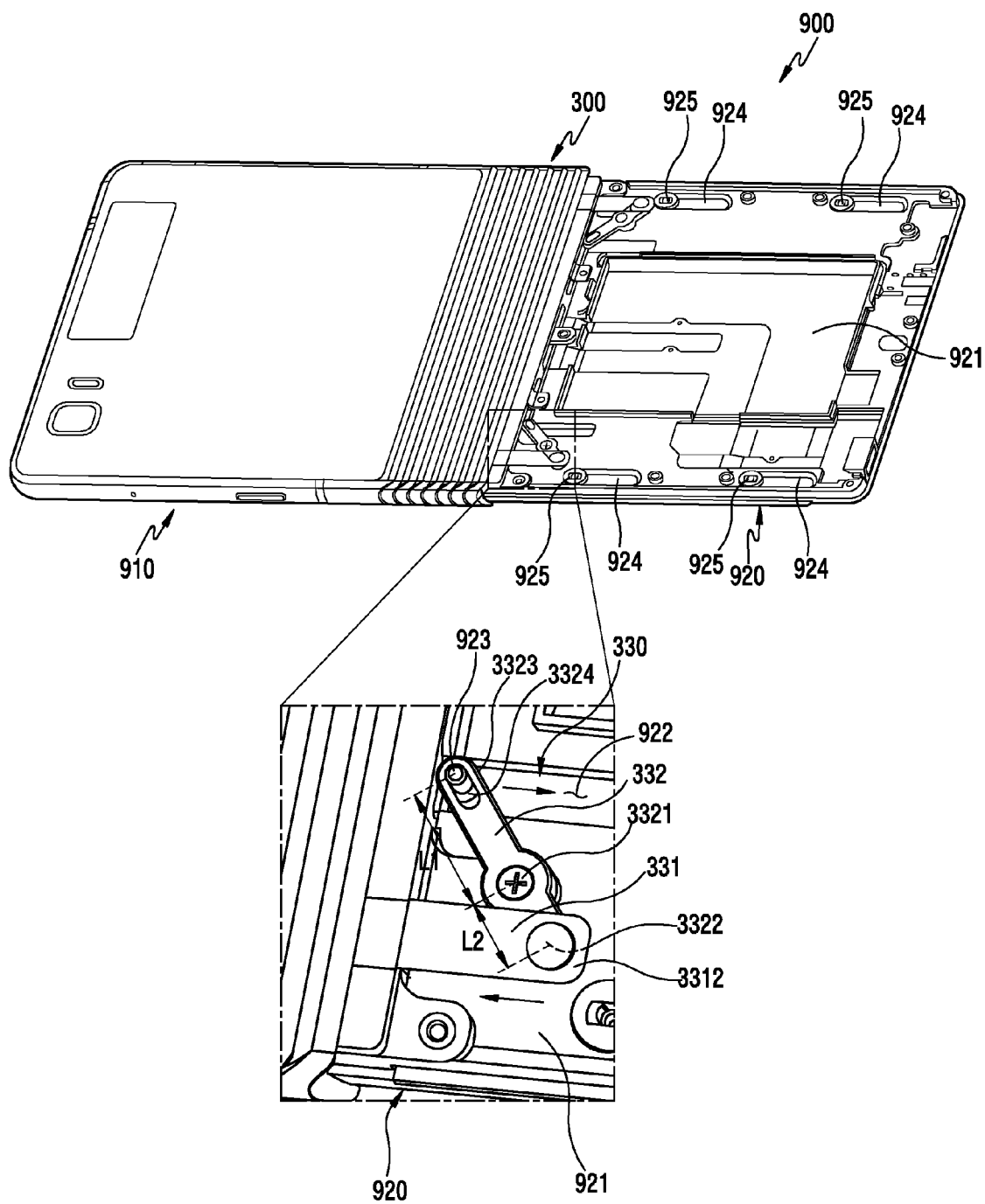
FIG. 9 illustrates a structure and an operational relationship of a lever assembly according to an embodiment of the present disclosure.

FIG. 9 illustrates a structure and an operational relationship of a lever assembly according to an embodiment of the present disclosure.

An electronic device 900 of FIG. 9 may be similar to the electronic device 100 of FIG. 1A to FIG. 1C or may be an electronic device according to another embodiment of the present disclosure. FIG. 9 will be described in association with the bracket 224, slide plate 225, and flexible display 201 disclosed in the electronic device 200 of FIG. 2.

Referring to FIG. 9, the electronic device 900 includes a first housing 910 and a foldable second housing 920 rotatable about the hinge assembly 300 in the first housing 910. The second housing 920 may have the bracket 224 disposed to an upper portion thereof as shown in FIG. 2, and the bracket 224 may have a slide plate 225 disposed to an upper portion thereof so as to be movable in an interlocking manner depending on a movement of the lever 332. According to an embodiment of the present disclosure, a guide rail 924 having a specific length may be formed on an inner surface 921 of the second housing 920, and a plate fastener 925 may be controlled so that a reciprocal movement is possible along the guide rail 924. A fastening protrusion 2251 protruding on a lower portion of the slide plate 225 of FIG. 2 may be fixed to the plate fastener 925 by penetrating the bracket 224, thereby assisting the slide plate 225 to move smoothly and reciprocally on an upper portion of the bracket 224. Although four plate fasteners 925 are disposed near four corners of the second housing 920 to perform the reciprocal movement along the guide rail 924, the present disclosure is not limited thereto. For example, the guide rail 924 and the plate fastener 925 installed to be movable in association therewith may be constructed such that less than four, or more than four, elements are disposed to various locations of the inner surface 921 of the second housing 920.

According to an embodiment of the present disclosure, a guide rail 922 having a specific length may be formed in the vicinity where the lever 332 is disposed in the inner surface 921 of the second housing 920, and a lever slide 923 may be controlled in the guide rail 922 to perform a reciprocal movement depending on the guide rail 922. The lever slide 923 may be disposed to a long hole 3324 formed on a second end 3323 of the lever 332 in an inserting manner, and may be fixed to the slide plate 225 in a rotatable manner by penetrating the bracket 224. Therefore, when the first end 3322 of the lever 332 rotates about the lever rotation axis 3321 depending on a movement of the free end 3312, the second end 3323 of the lever 332 also rotates in the same direction, and the lever slide 923 may also move along the guide rail 922 in an interlocking manner. The slide plate 225 fixed in a rotatable manner to the level slide 923 which moves along the guide rail 922 may also move in the same direction of the lever slide 923, and the flexible display 201 fixed to the slide plate 225 may also move in an interlocking manner.

According to an embodiment of the present disclosure, a movement amount of the flexible display 201 may be adjusted in the second housing 920 depending on a radius of curvature and a folding level. In this case, a distance L1 from the lever rotation axis 3321 to the second end 3323 and a distance L2 from the lever rotation axis 3321 to the first end 3322 may be adjusted to regulate a reciprocal movement amount of the slide plate 225. For example, the shorter the distance L1 from the lever rotation axis 3321 to the second end 3323, the smaller the reciprocal movement amount of the slide plate, and the longer the distance L1 from the lever rotation axis 3321 to the second end 3323, the greater the reciprocal movement amount of the slide plate 225.

Figure 10A:
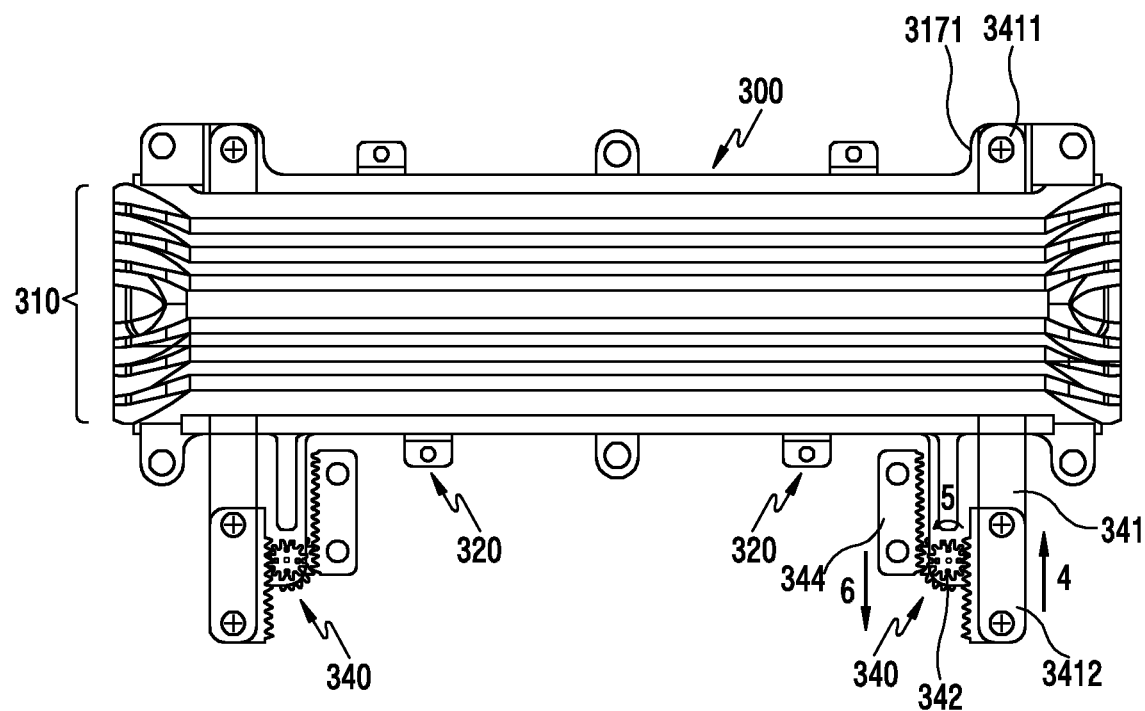
FIG. 10A and FIG. 10B illustrate structures of a hinge assembly to which a gear assembly is applied according to an embodiment of the present disclosure.
Figure 10B:
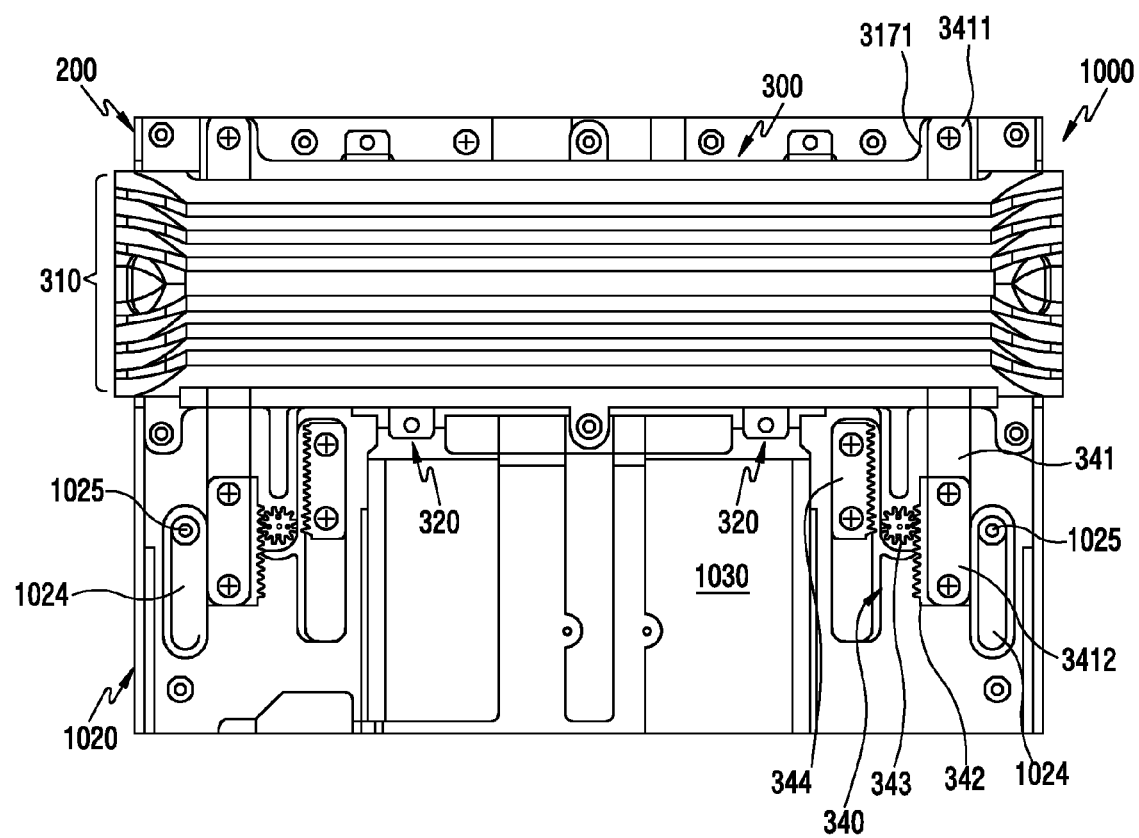

FIG. 10A and FIG. 10B illustrate structures of a hinge assembly to which a gear assembly is applied according to an embodiment of the present disclosure.

The electronic device of FIG. 10B may be similar to the electronic device 100 of FIG. 1A to FIG. 1C or the electronic device 200 of FIG. 2 or may be an electronic device according to another embodiment of the present disclosure.

As described above, the lever assembly 330 operating by interlocking with the guide member 331 and which moves depending on a folding motion of the hinge assembly 300 has been illustrated and described as a drive assembly of a flexible display. However, the present disclosure is not limited thereto, and thus it may be replaced with the gear assembly 340 as the drive assembly of the flexible display as illustrated in FIGS. 10A and 10B.

Referring to FIG. 10A and FIG. 1B, since the structure of the multi-bar assembly 310, clutch assembly 320, and guide member 341 of the hinge assembly 300 is the same as the aforementioned structure, a detailed description thereof will be.

According to an embodiment of the present disclosure, an electronic device 1000 includes a first housing 1010 and a foldable second housing 1020 rotatable about the hinge assembly 300 in the first housing 1010. A slide plate 1030 may be disposed to an upper portion of the second housing 1020 so as to be movable in an interlocking manner depending on a movement of the gear assembly 340. A guide rail 1024 having a specific length may be formed on an inner surface 1021 of the second housing 1020, and a plate fastener 1025 may be controlled so that a reciprocal movement is possible along the guide rail 1024. A slide plate 1030 may be fixed to the plate fastener 1025, thereby assisting the slide plate 1030 to smoothly move reciprocally in the second housing 1020.

According to an embodiment of the present disclosure, the gear assembly 340 includes a first rack gear 342 which moves together by being fixed to the free end 3412 of the guide member 341, a pinion gear 343 disposed in a rotatable manner to be engaged with the first rack gear 342, and a second rack gear 344 which is disposed such that a reciprocal movement is possible in the second housing 1020 of the electronic device so as to be engaged with the pinion gear 343. When the hinge assembly 300 is bent to be curved with a specific radius of curvature (when the electronic device is folded), the guide member 341 may move in a direction 4. At the same time, the first rack gear 342 may also move in the direction 4, and the pinion gear 343 engaged with the first rack gear 342 may rotate in a direction 5. The second rack gear 344 may move in a direction 6 by the pinion gear 343 rotating in the direction 5. Since the second rack gear 344 is installed to interlock with the slide plate 1030, the slide plate 1030 may move in an interlocking manner in a direction opposite to a movement direction of the guide member 341 which moves depending on a folding motion of the hinge assembly 300.

Figure 11:
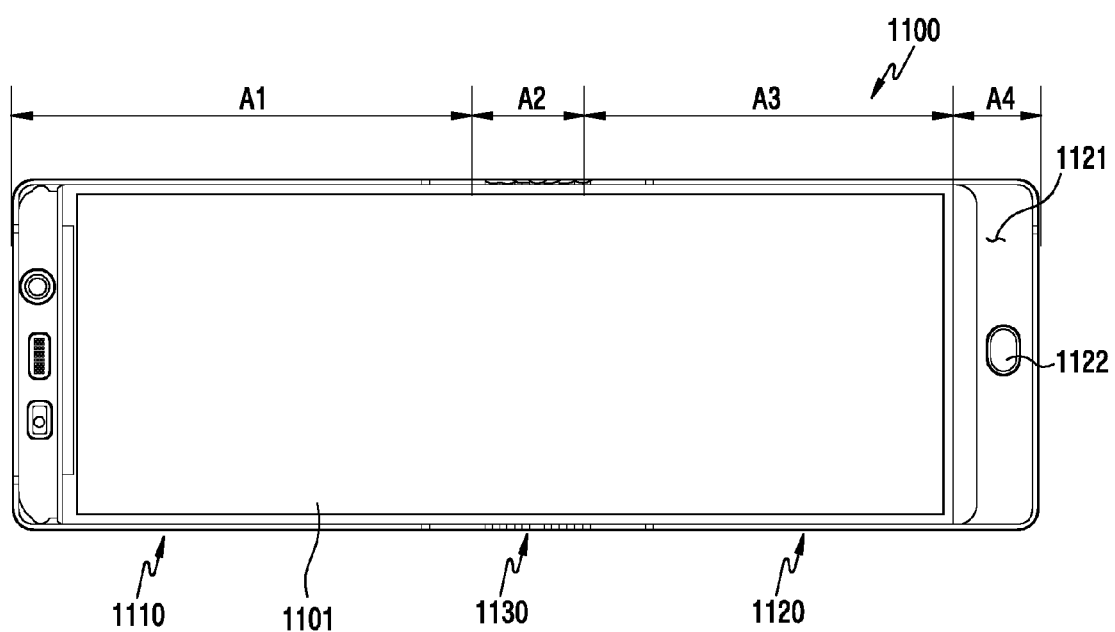
FIG. 11 illustrates a structure of an electronic device according to an embodiment of the present disclosure.

FIG. 11 illustrates a structure of an electronic device according to an embodiment of the present disclosure.

Figure 12:
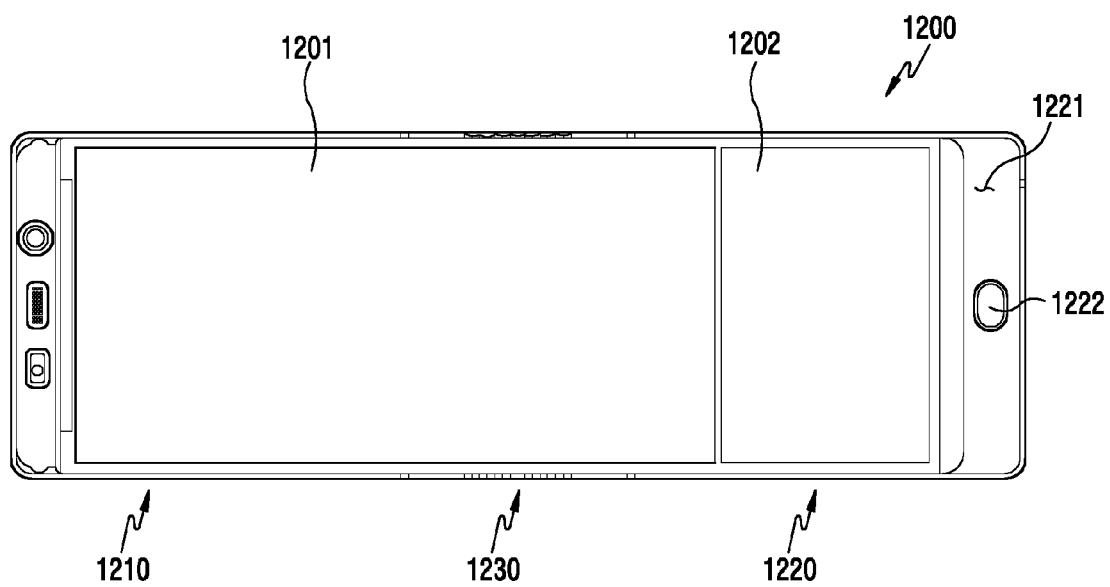
FIG. 12 illustrates a structure of an electronic device according to another embodiment of the present disclosure.

FIG. 12 illustrates a structure of an electronic device according to another embodiment of the present disclosure Electronic devices 1100 and 1200 of FIG. 11 of FIG. 12 may be similar to the electronic device 100 of FIG. 1A to FIG. 1C, the electronic device 200 of FIG. 2, the electronic device 900 of FIG. 9, or the electronic device 1000 of FIG. 10, or may be an electronic device according to another embodiment of the present disclosure.

Referring to FIG. 11, the foldable type electronic device 1100 includes a first body 1110 and a second body 1120 which is foldable in the first body 1110 in a rotatable manner with respect to a hinge assembly 1130. According to an embodiment of the present disclosure, the first body 1110 and the second body 1120 may rotate by the hinge assembly 1130 so as to face each other, and the first body 1110 and the second body 1120 may be disposed in general to overlap with each other.

According to an embodiment of the present disclosure, the electronic device 1100 includes a flexible display 1101 disposed to at least one portion of the second body 1120 across the first body 1110 and the hinge assembly 1130. The flexible display 1101 may include a flexible touch screen device including a touch sensor. The flexible display 1101 may include a touch sensor and a force sensor.

According to an embodiment of the present disclosure, the electronic device 1100 includes display areas A1 to A3 and an area A4 for accommodating a movement amount of one end of the flexible display 1101 for performing a specific reciprocal movement depending on a folding motion of the electronic device 1100. A display accommodating area 1121 may be included in the second body 1120. A width of the display accommodating area 1121 for accommodating one end of the flexible display 1101 may be maximized by an unfolding motion of the hinge assembly 1130 in a state where the foldable type electronic device 1100 is fully open. However, as the foldable type electronic device 1100 is folded, an end portion of the flexible display 1101 may be pushed to the display accommodating area 1121 and thus a width of the display accommodating area 1121 may be gradually minimized.

According to an embodiment of the present disclosure, the electronic device 1100 is generally used in a fully open state. In this case, the width of the display accommodating area 1121 is maximized, and thus at least one component capable of performing at least one function may be disposed to this area. As illustrated in FIG. 11, at least one key button 1122 may be disposed to the display accommodating area 1121. The key button 1122 may be used as a home button. However, the present disclosure is not limited thereto, and thus the component disposed to the display accommodating area 1121 may include at least one sensor module (e.g., an optical sensor, a proximity sensor, an infrared sensor, an ultrasonic sensor, and the like). The component may include a hall sensor for sensing a magnet disposed to the first body 1110 of the electronic device 1100.

Referring to FIG. 12, the electronic device 1200 includes a first body 1210 and a second body 1220 which is foldable in a rotatable manner about a hinge assembly 1230 in the first body 1210. According to an embodiment of the present disclosure, the electronic device 1200 includes a flexible display 1201 disposed in the first body 1210 and one area of the second body 1220 across the hinge assembly 1230 and a display 1202 disposed in one area of the second body 1220 is separate from the flexible display 1201. The display 1202 may be implemented as a normal hard type (non-flexible) display since it is disposed to an area of the second body 1220. In this case, the display 1202 may be installed together with the flexible display 1201 to a slide plate disposed to the second body 1220 to slide by interlocking with a folding motion of the hinge assembly 1230.

According to an embodiment of the present disclosure, although at least one key button 1222 may be disposed to the display accommodating area 1221 of the second body 1220, the present disclosure is not limited thereto. Thus, various components may be disposed as described above.

According to an embodiment of the present disclosure, a flexible display moves in an interlocking manner depending on a folding motion of an electronic device, and thus is always in close contact with the electronic device, thereby avoiding breakage and improving user convenience.

According to an embodiment of the present disclosure, an electronic device includes a first housing including a first face facing in a first direction, a second housing including a second face facing in the first direction, a hinge assembly for coupling the first housing to the second housing such that the first housing and the second housing may be folded with a specific radius of curvature, and for allowing the first face and the second face to face each other when the first housing and the second housing are folded, a flexible display disposed in at least one area of the first face, at least one area of the second face, and across the hinge assembly, a guide member disposed to the hinge assembly which moves based on a folding motion and an unfolding motion of the hinge assembly, and a drive assembly for moving the flexible display in a sliding manner in a direction opposite to a direction of the guide member on the second face.

The flexible display may be moved by the drive assembly in a second direction perpendicular to the first direction based on the unfolding motion of the hinge assembly on the second face of the second housing, and may be moved in a third direction opposite to the second direction based on the folding motion of the hinge assembly.

The second face of the second housing may include a display accommodating area for accommodating a movement of the flexible display based on a folding and unfolding motion of the flexible display.

The display accommodating area may include at least one component which is exposed to the outside when the first housing and the second housing are unfolded.

The at least one component may include at least one of a key and at least one sensor.

The hinge assembly may include a multi-bar assembly forming an outer shape of the hinge assembly and including a plurality of unit multi-bars, and a clutch assembly inserted in the multi-bar assembly and connecting the plurality of unit multi-bars to be curved with a specific radius of curvature. A first side multi-bar disposed to one end among the plurality of unit multi-bars may be fixed to the first housing, and a second side multi-bar disposed to the other end among the plurality of unit multi-bars may be fixed to the second housing.

The clutch assembly may include a plurality of unit clutches comprising a first shaft accommodating unit and a second shaft accommodating unit extended from the first shaft accommodating unit, and a plurality of unit shafts disposed to the first shaft accommodating unit and the second shaft accommodating unit of the unit clutch in a penetrating manner. One end of the plurality of unit shafts is disposed to the first shaft accommodating unit of the unit clutch and the other end of the plurality of unit shafts penetrates the second shaft accommodating unit of another unit clutch next to the unit clutch. The plurality of unit clutches may be installed in a mutually rotatable manner by being consecutively extended by the plurality of unit shafts.

The first shaft accommodating unit of the unit clutch may be configured in a self-rotatable manner about the unit shaft, and the second shaft accommodating unit may be configured to rotate together with the unit shaft.

Teeth may be formed on an outer surface of the first shaft accommodating unit and second shaft accommodating unit of the unit clutch, and each of the unit shafts may be folded in an interlocking manner by engaging the teeth.

After the clutch assembly is inserted to the multi-bar assembly, the unit shafts may be correspondingly fixed to the respective unit multi-bars.

The shaft assembly may be fixed in such a manner that a screw is fastened to each of the unit multi-bar after penetrating both ends of each of the unit shafts.

The guide member may be disposed to the multi-bar assembly in a penetrating manner in such that one end is fixed by the first side multi-bar and the other end moves in the second direction or the third direction by a folding and unfolding motion of the multi-bar.

The drive assembly may include a lever fixed to the second side multi-bar in a rotatable manner, and installed such that one end with respect to a rotation axis interlocks with the other end of the guide member, a lever slide moves reciprocally along a guide rail formed on the second face of the second housing, and installed to interlock with the other end of the lever, and a slide plate disposed on the second face in the second direction or the third direction in a sliding manner by being fixed to the lever slide so that one area of the flexible display is fixed.

A reciprocal movement distance of the slide plate may be based on a distance from the rotation axis of the lever to a location at which the lever slider is installed.

The drive assembly may include a first rack gear fixed to the other end of the guide member, a pinion gear engaged with the first rack gear and fixed to the second side multi-bar or the second housing in a rotatable manner, a second rack gear engaged with the pinion gear which moves reciprocally on the second face of the second housing in a second direction or a third direction, and a slide plate fixed to the second rack gear, and disposed on the second face in a sliding manner in the second direction or the third direction such that one area of the flexible display is fixed.

A reciprocal movement distance of the slide plate may be defined by a gear ration of the first rack gear, the pinion gear, and the second rack gear.

In the multi-bar assembly which is folded by the clutch assembly, a motion of folding or unfolding by more than a specific rotation amount may be controlled by an outer shape structure of each unit multi-bar.

The multi-bar assembly may be prevented from being unfolded past a parallel position when the second housing is unfolded in the first housing, and may be uniformly curved with a specific radius of curvature when the second housing is unfolded in the first housing.

At least one display may be disposed to an area in which the flexible display is not displayed in the second face of the second housing.

According to an embodiment of the present disclosure, an electronic device includes a first housing including a first face facing in a first direction, a second housing including a second face facing in the first direction, a hinge assembly for coupling the first housing to the second housing such that the first housing and the second housing can be folded with a specific radius of curvature, and for allowing the first face and the second face to face each other when the first housing and the second housing are folded, a flexible display disposed in at least one area of the first face, at least one area of the second face, and across the hinge assembly, a guide member disposed in the hinge assembly, which moves in a second direction perpendicular to the first direction based on a folding motion of the hinge assembly, and moves in a third direction facing the second direction based on an unfolding motion of the hinge assembly, a lever disposed to one end of the hinge assembly in a rotatable manner, and installed such that one end with respect to a rotation axis interlocks with the guide member, and a slide plate installed on the second face in a sliding manner by being connected to the other end of the lever to accommodate the flexible display. The lever may move the slide plate in a direction opposite to a movement direction of the guide member.

While various embodiments of the present disclosure have been shown and described with reference to certain embodiments thereof, it will be understood by those skilled in the art that various changes in form and details may be made therein without departing from the spirit and scope of the embodiments of the present disclosure as defined by the appended claims and their equivalents. Therefore, the scope of the various embodiments of the present disclosure are defined not by the detailed description of the various embodiments of the present disclosure but by the appended claims and their equivalents, and all differences within the scope will be construed as being included in the various embodiments of the present disclosure.

What is claimed is:

1. An electronic device comprising:
   a first housing comprising a first face facing in a first direction;
   a second housing comprising a second face facing in the first direction;
   a hinge assembly for coupling the first housing to the second housing such that the first housing and the second housing can be folded toward each other, and for allowing the first face and the second face to face each other when the first housing and the second housing are completely folded;
   a flexible display disposed in at least a portion of the first face and at least a portion of the second face and across the hinge assembly;
   a guide member disposed in the hinge assembly which moves based on a folding motion and an unfolding motion of the hinge assembly; and
   a drive assembly for moving the flexible display in a sliding manner in a direction opposite to a direction of the guide member on the second face.

2. The electronic device of claim 1, wherein the flexible display is moved by the drive assembly in a second direction perpendicular to the first direction based on the unfolding motion of the hinge assembly on the second face of the second housing, and is moved in a third direction opposite to the second direction based on the folding motion of the hinge assembly.

3. The electronic device of claim 1, wherein the second face of the second housing comprises a display accommodating area for accommodating a movement of the flexible display based on the folding and unfolding motion of the flexible display.

4. The electronic device of claim 3, wherein the display accommodating area comprises at least one component which is exposed to the outside when the first housing and the second housing are unfolded.

5. The electronic device of claim 4, wherein the at least one component comprises at least one of a key and at least one sensor.

6. The electronic device of claim 1, wherein the hinge assembly comprises:
   a multi-bar assembly forming an outer shape of the hinge assembly and comprising a plurality of unit multi-bars; and
   a clutch assembly inserted in the multi-bar assembly and connecting the plurality of unit multi-bars to be curved with a specific radius of curvature,
   wherein a first side multi-bar disposed to one end of the plurality of unit multi-bars is fixed to the first housing, and a second side multi-bar disposed to the other end of the plurality of unit multi-bars is fixed to the second housing.

7. The electronic device of claim 6, wherein the clutch assembly comprises:
   a plurality of unit clutches comprising a first shaft accommodating unit and a second shaft accommodating unit extended from the first shaft accommodating unit; and
   a plurality of unit shafts disposed to the first shaft accommodating unit and the second shaft accommodating unit of the unit clutch in a penetrating manner,
   wherein one end of the plurality of unit shafts is disposed to the first shaft accommodating unit of the unit clutch and the other end of the plurality of unit shafts penetrate the second shaft accommodating unit of another unit clutch next to the unit clutch, and
   wherein the plurality of unit clutches are installed in a mutually rotatable manner by being consecutively extended by the plurality of unit shafts.

8. The electronic device of claim 7, wherein the first shaft accommodating unit of the plurality of unit clutches is configured in a self-rotatable manner about the plurality of unit shafts, and the second shaft accommodating unit is configured to rotate together with the plurality of unit shafts.

9. The electronic device of claim 7, wherein teeth are formed on an outer surface of the first shaft accommodating unit and the second shaft accommodating unit of the plurality of unit clutches, and each of the plurality of unit shafts is folded in an interlocking manner by engaging the teeth.

10. The electronic device of claim 7, wherein, after the clutch assembly is inserted in the multi-bar assembly, the plurality of unit shafts are correspondingly fixed to the respective plurality of unit multi-bars.

11. The electronic device of claim 10, wherein the shaft assembly is fixed by a screw which is fastened to each of the plurality of unit multi-bars after penetrating both ends of each of the plurality of unit shafts.

12. The electronic device of claim 6, wherein the guide member is disposed to the multi-bar assembly in a penetrating manner such that one end is fixed by the first side multi-bar and the other end moves in the second direction or the third direction by a folding and unfolding motion of the multi-bar.

13. The electronic device of claim 12, wherein the drive assembly comprises:
 a lever fixed to the second side multi-bar in a rotatable manner, and installed such that one end with respect to a rotation axis interlocks with the other end of the guide member;
 a lever slide which moves reciprocally along a guide rail on the second face of the second housing, and installed to interlock with the other end of the lever; and
 a slide plate disposed on the second face in the second direction or the third direction in a sliding manner by being fixed to the lever slide so that one area of the flexible display is fixed.

14. The electronic device of claim 13, wherein a reciprocal movement distance of the slide plate is based on a distance from the rotation axis of the lever to a location at which the lever slider is installed.

15. The electronic device of claim 12, wherein the drive assembly comprises:
 a first rack gear fixed to the other end of the guide member;
 a pinion gear engaged with the first rack gear and fixed to the second side multi-bar or the second housing in a rotatable manner;
 a second rack gear engaged with the pinion gear which moves reciprocally on the second face of the second housing in a second direction or a third direction; and
 a slide plate fixed to the second rack gear, and disposed on the second face in a sliding manner in the second direction or the third direction such that one area of the flexible display is fixed.

16. The electronic device of claim 15, wherein a reciprocal movement distance of the slide plate is defined by a gear ratio of the first rack gear, the pinion gear and the second rack gear.

17. The electronic device of claim 7, wherein the folding or unfolding of the hinge assembly by more than a specific rotation amount is controlled by an outer shape structure of each of the plurality of unit multi-bars.

18. The electronic device of claim 17, wherein the multi-bar assembly is prevented from being unfolded past a parallel position when the second housing is unfolded in the first housing, and is uniformly curved with a specific radius of curvature when the second housing is unfolded in the first housing.

19. The electronic device of claim 1, wherein at least one display is disposed to an area in which the flexible display is not displayed in the second face of the second housing.

20. An electronic device comprising:
 a first housing comprising a first face facing in a first direction;
 a second housing comprising a second face facing in the first direction;
 a hinge assembly for coupling the first housing to the second housing such that the first housing and the second housing can be folded toward each other, and for allowing the first face and the second face to face each other when the first housing and the second housing are completely folded;
 a flexible display disposed in at least one area of the first face and at least one area of the second face, and across the hinge assembly;
 a guide member disposed in the hinge assembly which moves in a second direction perpendicular to the first direction based on a folding motion of the hinge assembly, and moves in a third direction facing the second direction based on an unfolding motion of the hinge assembly;
 a lever disposed to one end of the hinge assembly in a rotatable manner, and installed such that one end with respect to a rotation axis interlocks with the guide member; and
 a slide plate installed on the second face in a sliding manner by being connected to the other end of the lever to accommodate the flexible display,
 wherein the lever moves the slide plate in a direction opposite to a movement direction of the guide member.

* * * * *